US008231456B2

(12) United States Patent
Zielinski

(10) Patent No.: US 8,231,456 B2
(45) Date of Patent: Jul. 31, 2012

(54) GAMING DEVICE AND METHOD PROVIDING SIDE BET FOR WINNING FREE ACTIVATIONS

(75) Inventor: John H. Zielinski, Reno, NV (US)

(73) Assignee: IGT, Reno, NV (US)

(*) Notice: Subject to any disclaimer, the term of this patent is extended or adjusted under 35 U.S.C. 154(b) by 291 days.

(21) Appl. No.: 11/873,948

(22) Filed: Oct. 17, 2007

(65) Prior Publication Data

US 2009/0104977 A1 Apr. 23, 2009

(51) Int. Cl.
*A63F 13/00* (2006.01)

(52) U.S. Cl. ................................ 463/25; 463/16; 463/20

(58) Field of Classification Search .................... 463/16, 463/20, 25
See application file for complete search history.

(56) References Cited

U.S. PATENT DOCUMENTS

| | | | |
|---|---|---|---|
| 4,624,459 | A | 11/1986 | Kaufman |
| 4,669,731 | A | 6/1987 | Clarke |
| 4,695,053 | A | 9/1987 | Vazquez, Jr. et al. |
| 4,991,848 | A | 2/1991 | Greenwood et al. |
| 5,046,735 | A | 9/1991 | Hamano et al. |
| 5,152,529 | A | 10/1992 | Okada |
| 5,205,555 | A | 4/1993 | Hamano |
| 5,393,057 | A | 2/1995 | Marnell, II |
| 5,393,061 | A | 2/1995 | Manship et al. |
| 5,395,111 | A | 3/1995 | Inoue |
| 5,407,200 | A | 4/1995 | Zalabak |
| 5,423,539 | A | 6/1995 | Nagao |
| 5,449,173 | A | 9/1995 | Thomas et al. |
| 5,456,465 | A | 10/1995 | Durham |
| 5,560,603 | A | 10/1996 | Seelig et al. |
| 5,611,535 | A | 3/1997 | Tiberio |
| 5,630,753 | A | 5/1997 | Fuchs |
| 5,647,798 | A | 7/1997 | Falciglia |
| 5,655,961 | A | 8/1997 | Acres et al. |
| 5,704,835 | A | 1/1998 | Dietz, II |

(Continued)

FOREIGN PATENT DOCUMENTS

| | | |
|---|---|---|
| EP | 0 060 019 | 9/1982 |

(Continued)

OTHER PUBLICATIONS

Elvis Brochure and Article written by IGT, published in 1999.

(Continued)

*Primary Examiner* — David L Lewis
*Assistant Examiner* — William H McCulloch, Jr.
(74) *Attorney, Agent, or Firm* — Neal, Gerber & Eisenberg LLP

(57) ABSTRACT

A gaming device and method is disclosed which enables a player to win one or more free spins in a primary game after placing an optional side wager. The primary game has a plurality of symbols including at least one free spin symbol on a plurality of reels. If the player places the side wager, the free spin symbol is associated with a quantity of free spins. If the player places the side wager, the gaming device provides the player with the quantity of free spins for each free spin symbol that occurs on the reels in the primary game. The gaming device accumulates any free spins won during the primary game as additional free spins for a bonus or secondary game. The player can selectively (i) use the additional or accumulated free spins in the bonus or secondary game, (ii) store the additional or accumulated free spins, or (iii) convert the additional or accumulated free spins to an award.

27 Claims, 17 Drawing Sheets

U.S. PATENT DOCUMENTS 5,711,525 A 1/1998 Breeding
5,722,891 A 3/1998 Inoue
5,772,506 A 6/1998 Marks et al.
5,775,692 A 7/1998 Watts et al.
5,779,544 A 7/1998 Seelig et al.
5,788,573 A 8/1998 Baerlocher et al.
5,807,172 A 9/1998 Piechowiak
5,823,873 A 10/1998 Moody
5,823,874 A 10/1998 Adams
5,833,537 A 11/1998 Barrie
5,848,932 A 12/1998 Adams
5,851,148 A 12/1998 Brune et al.
5,855,514 A 1/1999 Kamille
5,876,284 A 3/1999 Acres et al.
5,882,261 A 3/1999 Adams
5,911,418 A 6/1999 Adams
5,918,880 A 7/1999 Voigt, IV et al.
5,919,088 A 7/1999 Weiss
5,935,002 A 8/1999 Falciglia
5,947,820 A 9/1999 Morro et al.
5,964,463 A 10/1999 Moore, Jr.
5,971,849 A 10/1999 Falciglia
5,980,384 A 11/1999 Barrie
5,984,781 A 11/1999 Sunaga
5,984,782 A 11/1999 Inoue
5,988,638 A 11/1999 Rodesch et al.
5,997,401 A 12/1999 Crawford
6,003,867 A 12/1999 Rodesch et al.
6,004,207 A 12/1999 Wilson, Jr. et al.
6,012,982 A 1/2000 Piechowiak et al.
6,015,346 A 1/2000 Bennett
6,056,642 A 5/2000 Bennett
6,059,289 A 5/2000 Vancura
6,059,658 A 5/2000 Mangano et al.
6,062,980 A 5/2000 Luciano
6,068,552 A * 5/2000 Walker et al. .................. 463/21
6,089,976 A 7/2000 Schneider et al.
6,089,977 A 7/2000 Bennett
6,089,978 A 7/2000 Adams
6,102,400 A 8/2000 Scott et al.
6,102,798 A 8/2000 Bennett
6,110,041 A * 8/2000 Walker et al. .................. 463/20
6,113,098 A 9/2000 Adams
6,120,378 A 9/2000 Moody et al.
6,126,541 A 10/2000 Fuchs
6,126,542 A 10/2000 Fier
6,142,873 A 11/2000 Weiss et al.
6,142,874 A 11/2000 Kodachi et al.
6,142,875 A 11/2000 Kodachi et al.
6,155,925 A 12/2000 Giobbi et al.
6,159,095 A 12/2000 Frohm et al.
6,159,097 A 12/2000 Gura
6,159,098 A 12/2000 Slomiany et al.
6,162,121 A 12/2000 Morro et al.
6,168,520 B1 1/2001 Baerlocher et al.
6,168,523 B1 1/2001 Piechowiak et al.
6,173,955 B1 1/2001 Perrie et al.
6,174,233 B1 1/2001 Sunaga et al.
6,186,894 B1 2/2001 Mayeroff
6,190,254 B1 2/2001 Bennett
6,190,255 B1 2/2001 Thomas et al.
6,203,429 B1 3/2001 Demar et al.
6,203,430 B1 3/2001 Walker et al.
6,217,448 B1 4/2001 Olsen
6,220,959 B1 4/2001 Holmes, Jr. et al.
6,224,482 B1 5/2001 Bennett
6,224,483 B1 5/2001 Mayeroff
6,227,971 B1 5/2001 Weiss
6,231,442 B1 5/2001 Mayeroff
6,231,445 B1 5/2001 Acres
6,234,879 B1 5/2001 Hasegawa et al.
6,234,897 B1 5/2001 Frohm et al.
6,238,287 B1 5/2001 Komori et al.
6,251,013 B1 6/2001 Bennett
6,261,128 B1 7/2001 Heim et al.
6,261,177 B1 7/2001 Bennett
6,270,409 B1 8/2001 Shuster
6,270,411 B1 8/2001 Gura et al.
6,270,412 B1 8/2001 Crawford et al.
6,290,600 B1 9/2001 Glasson
6,299,165 B1 10/2001 Nagano
6,302,790 B1 10/2001 Brossard
6,305,686 B1 10/2001 Perrie et al.
6,309,300 B1 10/2001 Glavich
6,311,976 B1 11/2001 Yoseloff et al.
6,312,334 B1 11/2001 Yoseloff
6,315,660 B1 11/2001 DeMar et al.
6,315,663 B1 11/2001 Sakamoto
6,328,649 B1 12/2001 Randall et al.
6,334,613 B1 1/2002 Yoseloff
6,334,864 B1 1/2002 Amplatz et al.
6,340,158 B2 1/2002 Pierce et al.
6,347,996 B1 2/2002 Gilmore et al.
6,364,766 B1 4/2002 Anderson et al.
6,364,768 B1 4/2002 Acres et al.
6,394,902 B1 5/2002 Glavich et al.
6,398,644 B1 6/2002 Perrie et al.
6,439,993 B1 8/2002 O'Halloran
6,443,452 B1 9/2002 Brune
6,471,208 B2 10/2002 Yoseloff et al.
6,481,713 B2 11/2002 Perrie et al.
6,491,584 B2 12/2002 Graham et al.
6,517,432 B1 2/2003 Jaffe
6,537,150 B1 3/2003 Luciano et al.
6,537,152 B2 3/2003 Seelig et al.
6,551,187 B1 4/2003 Jaffe
6,561,904 B2 5/2003 Locke et al.
6,565,436 B1 5/2003 Baerlocher
6,599,185 B1 7/2003 Kaminkow et al.
6,602,136 B1 8/2003 Baerlocher et al.
6,604,740 B1 8/2003 Singer et al.
6,659,461 B2 * 12/2003 Yoseloff et al. ............... 273/274
6,663,489 B2 12/2003 Baerlocher
6,685,563 B1 2/2004 Meekins et al.
6,705,944 B2 3/2004 Luciano
6,726,563 B1 4/2004 Baerlocher et al.
6,733,389 B2 5/2004 Webb et al.
6,773,345 B2 8/2004 Walker et al.
6,776,711 B1 8/2004 Baerlocher
6,780,105 B1 8/2004 Kaminkow
6,811,483 B1 11/2004 Webb et al.
6,855,052 B2 2/2005 Weiss et al.
6,855,054 B2 2/2005 White et al.
6,869,360 B2 3/2005 Marks et al.
6,890,257 B2 5/2005 Baerlocher
6,899,620 B2 5/2005 Kaminkow et al.
6,908,383 B2 6/2005 Baerlocher et al.
6,913,532 B2 7/2005 Baerlocher et al.
6,955,600 B2 10/2005 Glavich et al.
6,960,134 B2 11/2005 Hartl et al.
6,984,174 B2 1/2006 Cannon et al.
7,004,835 B2 2/2006 Baerlocher
7,008,319 B2 3/2006 Montgomery et al.
7,033,272 B1 4/2006 Mason
7,052,395 B2 5/2006 Glavich et al.
7,056,213 B2 6/2006 Ching et al.
7,066,814 B2 6/2006 Glavich et al.
7,070,501 B2 7/2006 Cormack et al.
7,074,127 B2 7/2006 Cuddy et al.
7,090,580 B2 8/2006 Rodgers et al.
7,094,148 B2 8/2006 Baerlocher et al.
7,121,942 B2 10/2006 Baerlocher
7,223,172 B2 5/2007 Baerlocher et al.
7,233,922 B2 6/2007 Asher et al.
7,235,011 B2 6/2007 Randall et al.
7,238,110 B2 7/2007 Glavich et al.
7,258,611 B2 8/2007 Bigelow, Jr. et al.
7,322,887 B2 1/2008 Belger et al.
7,326,109 B2 2/2008 Baerlocher
7,331,862 B2 2/2008 Rodgers et al.
7,331,866 B2 2/2008 Rodgers et al.
7,331,867 B2 2/2008 Baerlocher et al.
7,341,513 B2 3/2008 Cuddy et al.
7,357,713 B2 4/2008 Marks et al.
7,357,716 B2 4/2008 Marks et al.
7,371,170 B2 5/2008 Cregan et al.
7,381,134 B2 6/2008 Cuddy et al.

| | | | | |
|---|---|---|---|---|
| 7,384,334 | B2 | 6/2008 | Glavich et al. | |
| 7,390,260 | B2 | 6/2008 | Englman | |
| 7,402,103 | B2 | 7/2008 | Baerlocher | |
| 7,419,429 | B2 * | 9/2008 | Taylor | 463/25 |
| 7,419,430 | B1 | 9/2008 | Joshi et al. | |
| 7,438,639 | B2 | 10/2008 | Osawa | |
| 7,467,999 | B2 | 12/2008 | Walker et al. | |
| 7,473,174 | B2 | 1/2009 | Cuddy et al. | |
| 7,503,849 | B2 * | 3/2009 | Hornik et al. | 463/20 |
| 7,618,319 | B2 * | 11/2009 | Casey et al. | 463/25 |
| 7,651,394 | B2 * | 1/2010 | Johnson | 463/26 |
| 7,662,040 | B2 * | 2/2010 | Englman et al. | 463/42 |
| 7,674,180 | B2 * | 3/2010 | Graham et al. | 463/29 |
| 7,699,696 | B2 * | 4/2010 | Baerlocher et al. | 463/16 |
| 7,744,458 | B2 * | 6/2010 | Marks et al. | 463/20 |
| 7,749,070 | B2 * | 7/2010 | Baerlocher et al. | 463/20 |
| 7,758,416 | B2 * | 7/2010 | Randall | 463/20 |
| 7,775,877 | B2 | 8/2010 | Baerlocher et al. | |
| 7,785,196 | B2 | 8/2010 | Baerlocher et al. | |
| 7,980,948 | B2 * | 7/2011 | Rowe et al. | 463/29 |
| 8,109,824 | B2 * | 2/2012 | Frank et al. | 463/20 |
| 8,118,679 | B2 * | 2/2012 | Gagner | 463/42 |
| 2001/0009865 | A1 | 7/2001 | Demar et al. | |
| 2001/0048193 | A1 * | 12/2001 | Yoseloff et al. | 273/138.1 |
| 2002/0010017 | A1 | 1/2002 | Bennett | |
| 2002/0045474 | A1 * | 4/2002 | Singer et al. | 463/20 |
| 2002/0052233 | A1 | 5/2002 | Gauselmann | |
| 2002/0086725 | A1 | 7/2002 | Fasbender et al. | |
| 2002/0151354 | A1 | 10/2002 | Boesen et al. | |
| 2002/0198042 | A1 * | 12/2002 | Webb et al. | 463/20 |
| 2002/0198044 | A1 | 12/2002 | Walker et al. | |
| 2003/0008702 | A1 * | 1/2003 | Meyer | 463/16 |
| 2003/0022712 | A1 | 1/2003 | Locke | |
| 2003/0060272 | A1 | 3/2003 | Glavich et al. | |
| 2003/0069056 | A1 * | 4/2003 | Cormack et al. | 463/16 |
| 2003/0069061 | A1 * | 4/2003 | Seelig et al. | 463/17 |
| 2003/0162585 | A1 * | 8/2003 | Bigelow et al. | 463/20 |
| 2003/0181234 | A1 * | 9/2003 | Falciglia, Sr. | 463/16 |
| 2003/0203752 | A1 * | 10/2003 | Kaminkow et al. | 463/20 |
| 2003/0211878 | A1 * | 11/2003 | Walker et al. | 463/13 |
| 2003/0216165 | A1 * | 11/2003 | Singer et al. | 463/20 |
| 2003/0224857 | A1 * | 12/2003 | Baerlocher | 463/42 |
| 2004/0048649 | A1 | 3/2004 | Peterson et al. | |
| 2004/0053681 | A1 * | 3/2004 | Jordan et al. | 463/20 |
| 2004/0063493 | A1 | 4/2004 | Baerlocher | |
| 2004/0147308 | A1 * | 7/2004 | Walker et al. | 463/25 |
| 2004/0152500 | A1 | 8/2004 | Baerlocher | |
| 2004/0180714 | A1 | 9/2004 | Ward | |
| 2004/0242302 | A1 | 12/2004 | Baerlocher | |
| 2004/0266512 | A1 | 12/2004 | Kaminkow | |
| 2005/0003886 | A1 * | 1/2005 | Englman et al. | 463/25 |
| 2005/0020346 | A1 | 1/2005 | Baerlocher | |
| 2005/0043082 | A1 * | 2/2005 | Peterson et al. | 463/20 |
| 2005/0070354 | A1 * | 3/2005 | Baerlocher et al. | 463/20 |
| 2005/0075163 | A1 | 4/2005 | Cuddy et al. | |
| 2005/0153769 | A1 * | 7/2005 | Casey et al. | 463/16 |
| 2005/0192072 | A1 * | 9/2005 | Fiden | 463/16 |
| 2005/0215311 | A1 | 9/2005 | Hornik et al. | |
| 2005/0215316 | A1 * | 9/2005 | Rowe et al. | 463/29 |
| 2005/0233796 | A1 | 10/2005 | Baerlocher et al. | |
| 2005/0288093 | A1 | 12/2005 | Englman et al. | |
| 2006/0003827 | A1 | 1/2006 | Hartl et al. | |
| 2006/0009277 | A1 | 1/2006 | Hartl et al. | |
| 2006/0063585 | A1 | 3/2006 | Cuddy | |
| 2006/0068882 | A1 * | 3/2006 | Baerlocher et al. | 463/20 |
| 2006/0068884 | A1 | 3/2006 | Baerlocher et al. | |
| 2006/0068885 | A1 | 3/2006 | Cregan et al. | |
| 2006/0068893 | A1 * | 3/2006 | Jaffe et al. | 463/20 |
| 2006/0068898 | A1 | 3/2006 | Maya | |
| 2006/0073876 | A1 | 4/2006 | Cuddy | |
| 2006/0073879 | A1 * | 4/2006 | Baerlocher | 463/20 |
| 2006/0073884 | A1 * | 4/2006 | Walker et al. | 463/25 |
| 2006/0084494 | A1 | 4/2006 | Belger et al. | |
| 2006/0121969 | A1 | 6/2006 | Marks et al. | |
| 2006/0148548 | A1 * | 7/2006 | Hornik et al. | 463/16 |
| 2006/0154717 | A1 | 7/2006 | Jackson | |
| 2006/0189369 | A1 * | 8/2006 | Taylor | 463/16 |
| 2006/0199636 | A1 | 9/2006 | Ching et al. | |
| 2006/0199637 | A1 | 9/2006 | Ching et al. | |
| 2007/0010316 | A1 | 1/2007 | Baerlocher et al. | |
| 2007/0021188 | A1 | 1/2007 | Rodgers et al. | |
| 2007/0049372 | A1 | 3/2007 | Olivas et al. | |
| 2007/0054726 | A1 | 3/2007 | Muir et al. | |
| 2007/0060294 | A1 | 3/2007 | Cuddy et al. | |
| 2007/0060297 | A1 | 3/2007 | Hein et al. | |
| 2007/0060375 | A1 | 3/2007 | Hein et al. | |
| 2007/0077979 | A1 | 4/2007 | Cohn et al. | |
| 2007/0087809 | A1 | 4/2007 | Baerlocher | |
| 2007/0213114 | A1 | 9/2007 | Caspers et al. | |
| 2007/0213123 | A1 | 9/2007 | Walker et al. | |
| 2007/0281778 | A1 | 12/2007 | Bigelow, Jr. et al. | |
| 2007/0287521 | A1 | 12/2007 | Glavich et al. | |
| 2007/0293306 | A1 | 12/2007 | Nee et al. | |
| 2008/0058046 | A1 | 3/2008 | Schwartz et al. | |
| 2008/0058052 | A1 | 3/2008 | Schwartz et al. | |
| 2008/0058053 | A1 | 3/2008 | Schwartz et al. | |
| 2008/0058054 | A1 | 3/2008 | Schwartz et al. | |
| 2008/0058089 | A1 | 3/2008 | Schwartz et al. | |
| 2008/0058091 | A1 | 3/2008 | Schwartz et al. | |
| 2008/0058092 | A1 | 3/2008 | Schwartz et al. | |
| 2008/0058099 | A1 | 3/2008 | Schwartz et al. | |
| 2008/0064480 | A1 | 3/2008 | Randall | |
| 2008/0076532 | A1 * | 3/2008 | Graham et al. | 463/25 |
| 2008/0081687 | A1 | 4/2008 | Blumel | |
| 2008/0102934 | A1 | 5/2008 | Tan | |
| 2008/0113760 | A1 | 5/2008 | Baerlocher | |
| 2008/0113770 | A1 | 5/2008 | Gelber et al. | |
| 2008/0113779 | A1 | 5/2008 | Cregan | |
| 2008/0132320 | A1 | 6/2008 | Rodgers | |
| 2008/0139296 | A1 | 6/2008 | Baerlocher et al. | |
| 2008/0139298 | A1 | 6/2008 | Rodgers et al. | |
| 2008/0146325 | A1 | 6/2008 | Walker et al. | |
| 2008/0153584 | A1 | 6/2008 | Cuddy et al. | |
| 2008/0182650 | A1 | 7/2008 | Randall et al. | |
| 2008/0200232 | A1 | 8/2008 | Baerlocher et al. | |
| 2008/0200237 | A1 | 8/2008 | Cuddy et al. | |
| 2008/0214292 | A1 * | 9/2008 | Bryant et al. | 463/25 |
| 2008/0220851 | A1 | 9/2008 | Glavich et al. | |
| 2009/0011827 | A1 * | 1/2009 | Englman et al. | 463/27 |
| 2009/0042644 | A1 * | 2/2009 | Zielinski | 463/27 |
| 2009/0104977 | A1 * | 4/2009 | Zielinski | 463/25 |
| 2009/0117989 | A1 * | 5/2009 | Arezina et al. | 463/20 |
| 2009/0127788 | A1 | 5/2009 | O'halloran | |
| 2010/0029364 | A1 * | 2/2010 | Zielinski | 463/20 |

FOREIGN PATENT DOCUMENTS

| | | |
|---|---|---|
| EP | 0 874 337 | 10/1998 |
| EP | 0 926 645 | 6/1999 |
| EP | 0 981 119 | 2/2000 |
| GB | 2 101 380 | 1/1983 |
| GB | 2 262 642 | 6/1993 |
| GB | 2 322 217 | 8/1998 |
| WO | WO 9732285 | 9/1997 |
| WO | WO 0032286 | 6/2000 |
| WO | WO 0115055 | 3/2001 |
| WO | WO 0126019 | 4/2001 |
| WO | WO 2007006002 | 1/2007 |
| WO | WO 2007130464 | 11/2007 |
| WO | WO 2008030905 | 3/2008 |
| WO | WO 2008143843 | 11/2008 |

OTHER PUBLICATIONS

Catch A Wave Advertisement written by IGT, published in 2001.

Dolphin Treasure Advertisement written by Aristocrat Leisure Industries Pty., Ltd., published in 1996.

Jackpot Party Brochures and Articles written by WMS Gaming, Inc., published in 1998.

Little Devils Brochure, written by IGT, published on or before Dec. 1998.

"Money In The Bank," Konami Gaming, published in Strictly Slots, available Jun. 2001.

Slot Machines Article, written by Marshall Fey, published by Reno-Tahoe Specialty, Inc., published in 1989.

Slotopoly Brochure by IGT, published in 1998.

Spin Til You Win Game Description written by IGT, published in 1996.

Top Dollar Brochure written by IGT, published in 1998.
Tropical Fever Glass, written by IGT, published prior to Apr. 2001.
Wheel of Fortune Video Brochure, written by IGT, published 1999.
Winning Streak Brochure, written by Aristocrat, published in 1994.

* cited by examiner

GAMING DEVICE AND METHOD PROVIDING SIDE BET FOR WINNING FREE ACTIVATIONS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require a player to place or make a wager to activate the primary or base game. In many of these gaming machines, the award is based on the player obtaining a winning symbol or symbol combination and on the amount of the wager (i.e., the higher the wager, the higher the award). Winning symbols or symbol combinations are typically displayed to the player by a paytable. The paytable usually associates lower awards with symbols or symbol combinations which are more likely to occur in the primary game and usually associates higher awards with symbols or symbol combinations less likely to occur in the primary game.

Secondary or bonus games are also known in gaming machines. These secondary or bonus games usually provide an additional award to the player. Secondary or bonus games usually do not require an additional wager by the player to be activated. Secondary or bonus games are often activated or triggered upon an occurrence of a designated triggering symbol or triggering symbol combination in the primary or base game of the gaming machine. For instance, a bonus symbol occurring on a payline on the third reel of a three reel slot machine triggers the secondary bonus game on that gaming device. Part of the enjoyment and excitement of playing certain gaming machines is the occurrence or triggering of the secondary or bonus game (even before the player knows how much the bonus award will be). In other words, obtaining a bonus event and a bonus award in the bonus event is part of the enjoyment and excitement for players.

Bonus games that provide players with large awards or the potential to win large awards are especially attractive to players. One way that gaming device manufacturers provide larger or more frequently occurring awards in slot gaming machines is by providing free spins to players. Such games typically provide the players a designated number of free spins at the beginning of the game.

There is a need to provide new and different ways to provide players with free spins in gaming machines as well as new and different gaming machines involving such free spins.

SUMMARY

The present disclosure provides a gaming system and method that enable a player to win one or more free activations in a play of a primary game if the player places an optional side wager for that play of the primary game. The side wager may be any suitable wager or bet and is preferably in addition to the regular wager for the play of the primary game. In various embodiments, the side wager enables the free activation feature, but provides no other advantage for the primary game or the paytable for the primary game. The free activations or opportunities won are accumulated and used subsequently as additional free activations for a bonus or secondary game.

For example, in one embodiment, the primary game has a plurality of reels and a plurality of symbols on the reels including at least one free activation or spin symbol on the reels. If the player places the side wager for a play of the primary game, the free spin symbol yields an associated quantity of free spins. That is, if the player places the side wager, the gaming system provides the player with the quantity of free spins for each free spin symbol that occurs on the reels in that play in the primary game. If the player does not place the side wager, the free spin symbols on the reels simply function as regular symbols which in various embodiments may or may not be associated with awards. The gaming system accumulates any free spins won during the primary game as additional free spins for a bonus or secondary game. The additional or accumulated free activations can help the player to obtain additional awards or higher awards in the bonus or secondary game. Free activations may substantially elevate award returns and increase player excitement and enjoyment.

In different embodiments, the player can selectively (by making a designated input): (i) use the additional or accumulated free activations in the bonus or secondary game (i.e., when a bonus or secondary game is triggered or begins), or (ii) convert the additional or accumulated free activations into an award or monetary value.

For example, in one embodiment, the gaming device enables the player to convert any accumulated free activations won in plays of the primary game into an award or monetary value. The award or monetary value can be predetermined, determined based on the average expected value of the free spin, randomly determined, determined based on a player's wager, determined based on a player status (as determined through a suitable player tracking system), or determined in any other suitable manner. In various embodiments, the gaming device enables the player to convert the free activations between plays of the primary game or to convert the free activations during plays of the primary game.

It is therefore an advantage of the gaming device and method described herein to provide a gaming device and method that provides larger awards to players.

Another advantage of the gaming device and method described herein to provide a gaming device and method that increases the number of award opportunities, such as free spins, in a game.

Additional features and advantages are described herein, and will be apparent from the following detailed disclosure, taken in conjunction with the accompanying sheets of drawings, wherein like numerals refer to like parts, elements, components, steps and processes.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
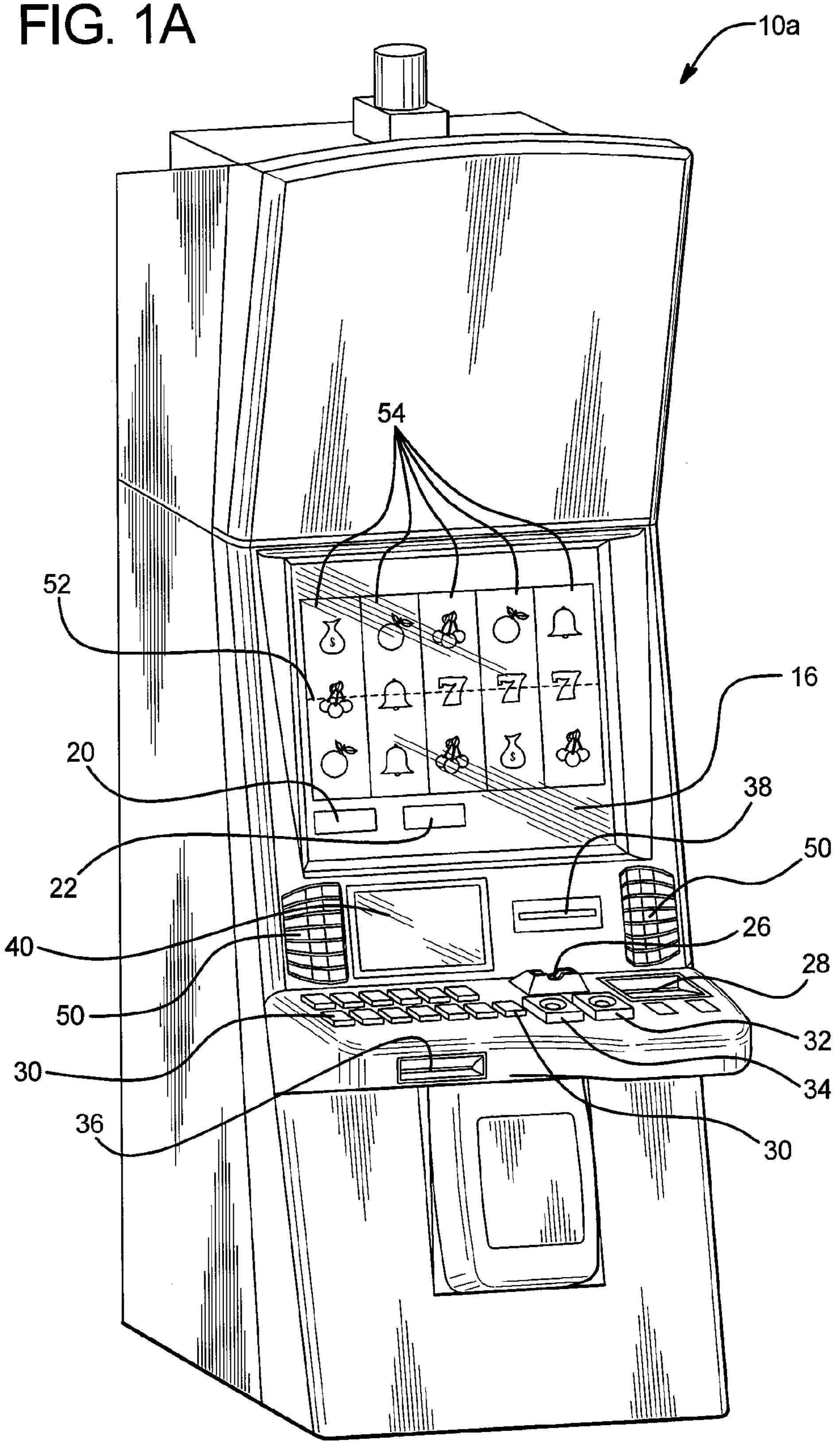
FIG. 1A is a front-side perspective view of one embodiment of the gaming device disclosed herein.
Figure 1B:
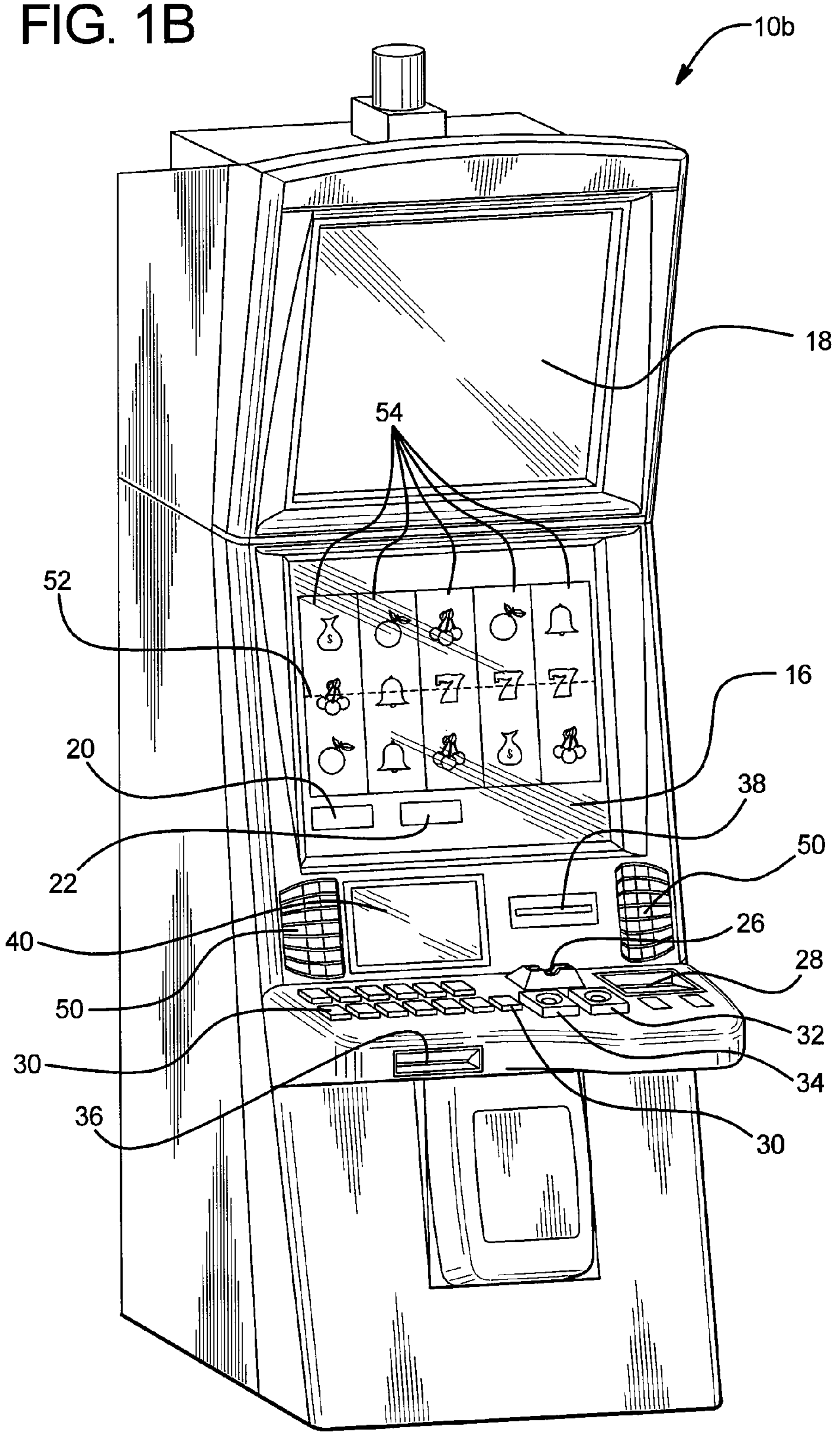
FIG. 1B is a front-side perspective view of another embodiment of the gaming device disclosed herein.

Referring now to the drawings, two example alternative embodiments of the gaming device of the disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
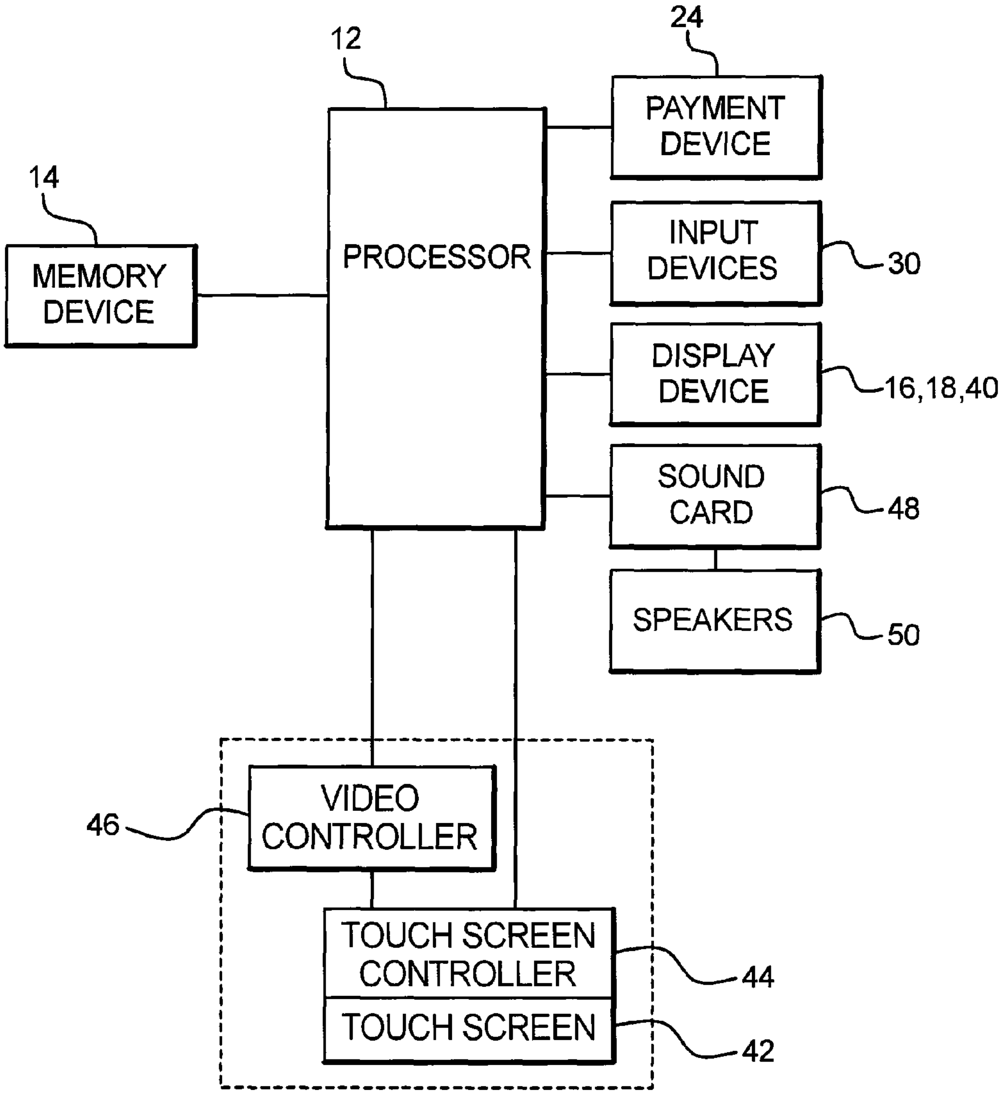
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
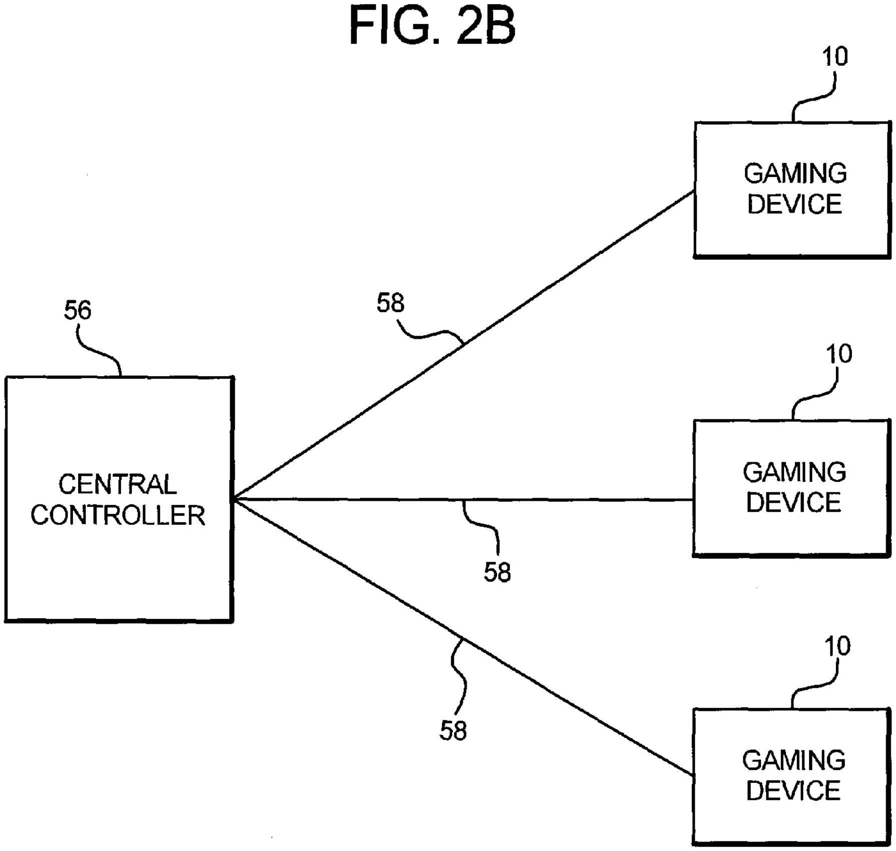
FIG. 2B is a schematic block diagram illustrating a plurality of gaming terminals in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player Identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Providing a Side Bet for Winning Free Activations

Generally, the gaming device and method disclosed herein enables a player to place an optional side wager to activate an opportunity to win one or more free activations such as free spins during a primary game of the gaming device. The number of free spins available for the player to win can be predetermined, randomly determined, determined based on a player ranking or status (as determined through a suitable player tracking system), or determined in any other suitable manner. The side wager may be any suitable wager or bet and is preferably in addition to the regular wager for the play of the primary game. In various embodiments, the side wager enables the free activation feature, but provides no other advantage for the primary game or the paytable for the primary game.

In one embodiment, the gaming device and method provide a primary game with a plurality of symbol generators such as reels and a secondary game that includes a designated number of free spins of the symbol generators or reels, such as one or more free spins or activations. The primary game operates upon a primary wager placed by a player. A display device of the gaming device displays a plurality of reels to the player for the primary game. The reels may be mechanical or video reels and include a plurality of symbols. The symbols include a plurality of award symbols and at least one designated or free spin symbol. The gaming device and method also includes at least one triggering event, such as a triggering symbol or a triggering symbol combination, which causes the secondary or bonus game to initiate if such triggering event occurs. The triggering event may be any other suitable event such as a mystery trigger or any other suitable trigger. A plurality of awards are associated with the award symbols such that the gaming device provides the award or awards associated with any award symbols indicated on the reels to the player for each spin.

The gaming device provides the player with an opportunity to place an optional side wager for the play of the primary game. The gaming device enables a player to place the optional side wager prior to the play of the primary game being initiated or having the results thereof displayed. The side wager activates an opportunity for the player to win one or more free spins in the primary game. In one embodiment, a player becomes eligible to win one or more free spins of the reels in the primary game after placing or wagering the side bet. The gaming device accumulates any free spins won by the player in the primary game for use in the secondary game. In one embodiment, before any play of the primary game, the gaming device enables the player to convert one or more accumulated free spins into an award or monetary value. In different embodiments, the gaming device enables the player to convert the free spins between plays of the primary game or to convert the free spins during plays of the primary game.

If the player forgoes the opportunity to place the side wager in the primary game, the designated or free spin symbol functions as one of the award symbols which may or may not be associated with an award. If the designated or free spin symbol is associated with an award, for each designated or free spin symbol that is indicated on the reels, the gaming device provides the player with the award associated with the designated or free spin symbol instead of a quantity of free spins. On the other hand, if the player places the side wager in the primary game, the gaming device activates an opportunity for the player to win one or more free spins in the primary game. In this embodiment, the gaming device associates each designated or free spin symbol with a quantity of free spins (e.g., three free spins). For example, if three designated or free spin symbols occur in any arrangement or location on the reels of the primary game, the gaming device provides the player with three quantities of free spins (e.g., nine free spins) for the secondary game. As described above, the placement or wagering of the side wager change at least one function of the designated or free spin symbol so that the player can win free spins in the primary game. In various embodiments, the free spin symbols or combinations thereof may still provide primary game awards according to the paytable of the primary game.

Figure 3:
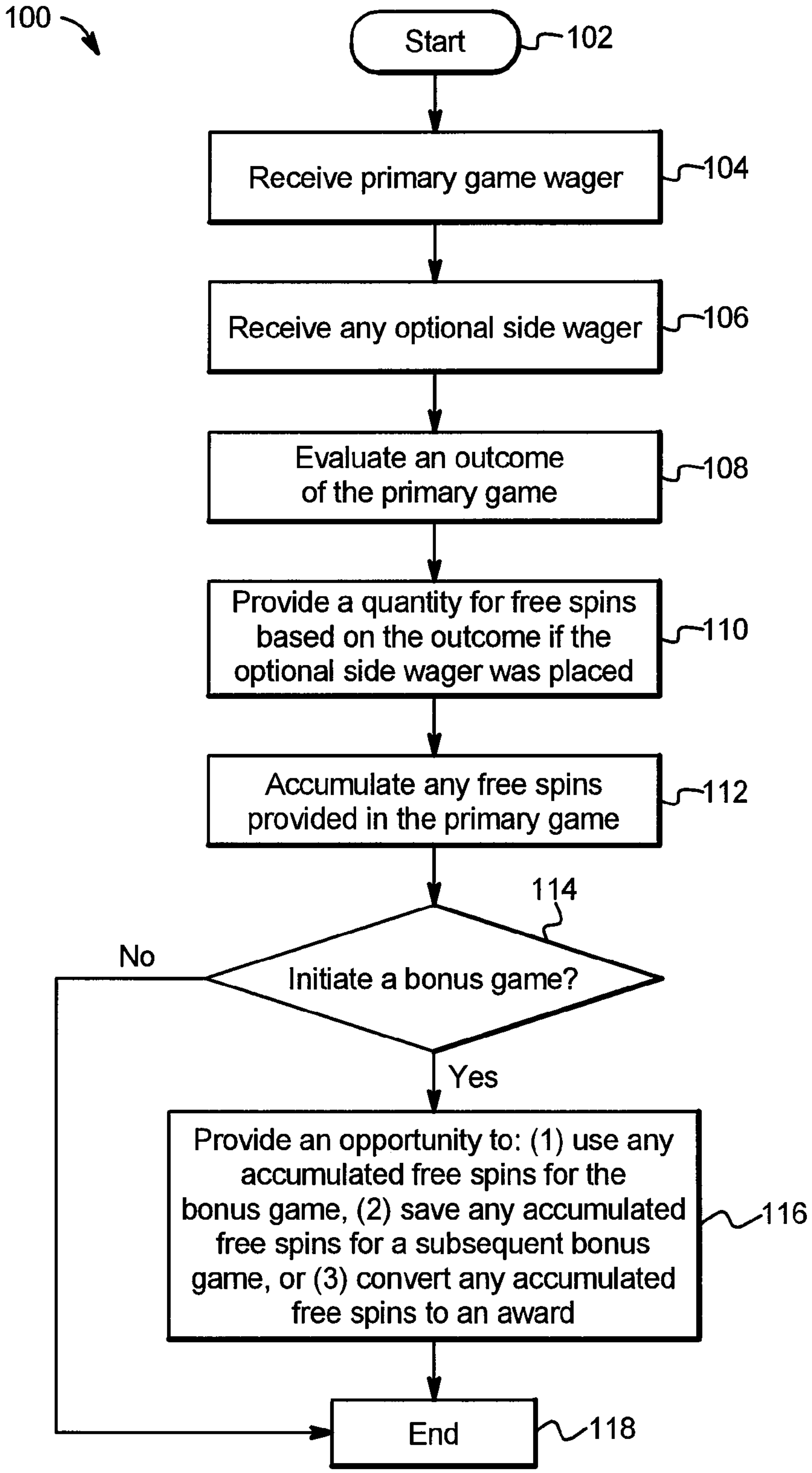
FIG. 3 is a flowchart of an example process for offering a player an opportunity to win free spins after an optional side wager via a gaming device according to one embodiment of the methods and apparatus of the present system.

Referring now to FIG. 3, a flowchart of an example process 100 for providing an opportunity for a player to win one or more free spins after placing an optional side wager via a gaming device 10 is illustrated. In one embodiment, the process 100 is embodied in one or more software programs stored in one or more memories and executed by one or more processors or controllers. Although the process 100 is described with reference to the flowchart illustrated in FIG. 3, it should be appreciated that many other methods of performing the acts associated with process 100 may be used. For example, the order of many of the blocks may be changed, many of the blocks described may be optional, and other steps may be added.

The process 100 begins as indicated by block 102. In one embodiment, the process 100 begins when a player places a primary wager for a primary game of the gaming device 10. The process includes receiving any primary game wager as indicated by block 104. The primary game can be a slot game, a poker game or any other suitable game. In the example process 100, the primary game is a slot game that includes a plurality of reels having a plurality of symbols associated with each reel.

The process 100 also includes receiving any optional side wager as indicated by block 106. In one embodiment, the gaming device 10 offers the opportunity to make the side wager to the player prior to the start or initialization of the primary game. In another embodiment, the gaming device offers the side wager to the player during the primary game prior to the result being displayed. The player may place the side wager sequentially or individually for multiple plays of the primary game. In one embodiment, the gaming device provides the player with an opportunity to place the side wager for a plurality of plays of the primary game. In another embodiment, the gaming device provides the player with the opportunity to place the side wager simultaneously for a plurality of plays of the primary games. In one such instance, the player places a plurality of individual side wagers (or one collective side wager including multiple individual side wagers) for one or more plays of the primary game. In one embodiment, one input such as one button enables the player to place both the primary and side wagers for the play of the primary game.

As the player plays the primary game, the gaming device causes an indication of one or more symbols on a plurality of reels. For each play of the primary game, the reels spin to indicate at least one symbol on each reel. The process 100 includes evaluating an outcome of the primary game as indicated by block 108. In one embodiment, the outcome of the primary game includes one or more symbols indicated on each reel. The gaming device 10 evaluates the symbols indicated on the reels to determine whether the player wins an award or any free spins.

The process 100 includes providing a quantity of free spins based on the outcome of the primary game if the side wager was placed as indicated by block 110. In one embodiment, a free spin symbol is associated with a designated quantity of free spins if the player has placed the side wager for that play of the game. For example, if the player has placed the side wager for a play of the primary game, and the free spin symbol is indicated on the reels, the gaming device provides the player with a designated quantity of free spins associated with that free spin symbol for that play of the primary game. In one embodiment, the amount of the side wager determine the number of free spins. In another embodiment, the amount of the side wager determine the range of possible free spins, and the number in that range is otherwise determined such as randomly.

As described above, when the player forgoes or rejects the opportunity to place the side wager, the free spin symbols can function to provide awards according to the paytable. In an alternative embodiment, one or more of the free spin symbols do not function to provide awards according to the paytable when the player forgoes or rejects the opportunity to place the side wager.

Any free spins won by the player in the primary game are accumulated as indicated by block 112. The gaming machine 10 accumulates and tracks any free spins provided to the player in the primary game. The gaming device 10 tracks or accounts for the free spins provided to the player in the primary game separately from any free spins initially provided to the player for the secondary or bonus game. That is, if the bonus or secondary game includes an initial quantity of free spins, any free spins won by the player in the primary game are accounted for, or tracked, separately. In one embodiment, a free spins accumulated remaining display or a free spins remaining display indicates any additional or accumulated free spins won by the player during one or more plays of the primary game.

As indicated by block 114, the gaming device 10 determines whether to initiate a bonus or secondary game. If a triggering event does not occur during a play of the primary game of the gaming device 10, the process 100 ends as indicated by block 118. For example, a player may cash out (e.g., by pressing the cash out button 34) before triggering or initiating the bonus or secondary game. In one embodiment, any free spins accumulated during the primary game are converted to an award when the player cashes out. In an alternative embodiment, any free spins accumulated for the gaming machine during the plays of the primary game are carried over to or saved for a subsequent player of the primary game. In one embodiment, the free spins are saved in association with a player tracking card or a player tracking account of the player. This enables the player to convert any accumulated free spins to an award, to switch gaming devices, or to suspend play at one gaming device and continue play from the same or different gaming device at a later time. In one embodiment, the gaming device provides the player a choice between an opportunity to convert the accumulated free spins into an award or monetary value and an opportunity to save or store the accumulated free spins until a later time. In an alternative embodiment, the accumulated free spins are lost if not employed before the player cashes out or otherwise stops playing.

If a triggering event occurs during a play of the primary game of the gaming device, the gaming device initiates the bonus or secondary game. In one embodiment, the triggering event includes a symbol or combination of symbols indicated on the reels and evaluated by the gaming device. In other embodiments, the triggering event is predetermined, randomly determined, determined based on a wager made by the player, determined based on a player's status or ranking (via a suitable player tracking system), determined independently from an outcome of the primary game, or determined in another suitable manner. In the example process 100, the bonus or secondary game begins upon a designated symbol or combination of symbols being indicated by the reels in the primary game.

In one embodiment, the bonus or secondary game includes an initial quantity of free spins of the reels. The initial quantity of free spins may include one or more free spins. The initial quantity of free spins may be predetermined, randomly determined, determined by a wager made by the player, determined by the players action in a primary or secondary game, or according to any other suitable method. Any additional or accumulated free spins won during the primary game can be used in addition to the initial quantity of free spins in the bonus or secondary game. Such additional free spins can be accounted for, or tracked, via the free spins remaining display. In one embodiment, the additional free spins are added to the initial quantity of free spins to give the player a higher quantity of free spins to begin the bonus or secondary game.

After the bonus or secondary game is triggered or initiated, the process 100 provides the player an opportunity to: (1) use any of the additional or accumulated free spins in the bonus or secondary game, (2) save any of the additional or accumulated free spins for a subsequent bonus or secondary game, or (3) convert any of the additional or accumulated free spins to an award, such as a monetary value as indicated by block 116. It should be appreciated that one or more of these options may be present in various embodiments.

If the player chooses to use any of the additional or accumulated free spins in the bonus or secondary game, the gaming device adds the additional free spins to the initial quantity of free spins for the secondary game. This gives the player more free spins, or additional award opportunities, for the bonus or secondary game. The bonus or secondary game ends when the initial quantity of free spins and any additional free spins won by the player, if any, are employed in the bonus or secondary game. That is, bonus or secondary game ends when the player uses all of the free spins available for that bonus or secondary game. It should be appreciated that the player may win additional free spins during the provided free spins in various embodiments.

If the player chooses to save or store any of the additional or accumulated free spins, the gaming device 10 reserves any saved or stored free spins for a subsequent bonus or secondary game. That is, the gaming device 10 enables the player to selectively employ any additional or accumulated free spins from the primary game in the bonus or secondary game. The gaming device 10 enables the player to decide when, or if, any of the additional or accumulated free spins are used. In one embodiment, if the player chooses to save or store any of the additional or accumulated free spins, the gaming device 10 provides the player with the initial quantity of free spins for the bonus or secondary game, if triggered. In such an instance, the bonus or secondary game ends when the player uses the initial quantity of free spins in the bonus or secondary game.

If the player chooses to convert any of the additional or accumulated free spins to an award, the gaming device 10 provides the player with an award, such as a monetary value, for each free spin won or accumulated in the primary game. In one example, each free spin is associated with a monetary value of 25. Thus, in this example, the gaming device 10 provides the player with an award or monetary value of 25 for each free spin that player won during the primary game. It should be appreciated that the monetary value or award associated with each free spin can be predetermined, determined based on the average expected value of the free spin, randomly determined, determined based on a wager made by the player, determined based on a player's status or ranking (via a suitable player tracking system), determined independently from an outcome of the primary game, or determined in another suitable manner. In one embodiment, the gaming device 10 enables the player to use any of the additional or accumulated free spins (that were not converted) in the bonus or secondary game. In one such instance, if the player won ten additional or accumulated free spins in the primary game, the player can convert four of the free spins to a monetary award (e.g., a monetary award of 100) and can use six of the additional or accumulated free spins during the bonus or secondary game (along with any initial quantity of free spins for the bonus or secondary game). In one embodiment, the amounts of free spins that can be converted and played is player defined. In one embodiment, the amounts of free spins that can be converted and played is predefined or predetermined.

As illustrated in FIG. 3, the process 100 ends upon completion of the bonus or secondary game as indicated by block 118. In one embodiment, the process 100 ends when the player has no additional or accumulated free spins remaining. In another embodiment, the process 100 ends when the player saves any remaining additional or accumulated free spins for a subsequent bonus game or converts any remaining additional or accumulated free spins to an award.

Referring to FIGS. 4A, 4B, 4C, 4D, 4F, 4G, 4H, 4I, 4J, 4K, and 4L, one embodiment of a game provided by the gaming device 10 disclosed herein is illustrated. A display device of the gaming device, such as the display device 16, displays the game on the gaming device. The game employs five reels 54 in this embodiment. It should be appreciated that any suitable number of reels may be employed in the game. In this embodiment, each of the reels 54 includes a plurality of symbols, which are represented by letters, numbers, or images. The symbols include at least one and preferably a plurality of award symbols 200, trigger symbols 202 and free spin symbols 204. The symbols may also include one or more blank symbols which may or may not act as non-award symbols (not shown). It should be appreciated that any suitable number and any suitable types of symbols may be employed in the gaming device.

Each symbol 200, 202, and 204 is positioned at a reel or symbol position on each of the reels 54. In each reel activation, the reels independently spin until each reel stops at a generated reel or symbol position (i.e., a reel stop position) to indicate a combination of symbols along one of a plurality of paylines 52. In this embodiment, at least one payline 52 is associated with a row of symbols, wherein the first reel or symbol position of reels 54 constitutes a first row of symbols. Accordingly, the symbols are indicated or generated on at least one of the paylines 54 associated with each row of the symbols in the game. In one embodiment, the gaming device employs one or more unisymbol display reels, wherein each symbol on a display of the gaming device represents or is included on a different reel.

Referring to FIGS. 4A to 4L, one embodiment of the gaming device causes a display device associated with the gaming device to display a plurality of the reels 54. The reels 54 each include a plurality of award symbols 200 such as letters A, K, Q and J, numbers 7, 8, 9, 10 or images of an orange, a bell, or a cherry. The reels also include at least one trigger symbol 202, which is designated with the words "TRIGGERING SYMBOL" in this embodiment but may be designated with any suitable designator or symbol. It should be appreciated that one or more of the reels 54 may each include at least one trigger symbol 202. Additionally, one or more of the reels 54 may include at least one free spin symbol 204. The free spin symbol 204 is designated with the word "FREE SPIN SYMBOL" but may be designated with any suitable designator or symbol. A probability of being indicated or generated is associated with each of the symbols 200, 202, and 204 on the reels 54. In the game, the probability of each of the symbols 200, 202, and 204 being indicated or generated on one of the reels 54 is suitably determined by the game implementer.

In one embodiment, a probability of being indicated on one or more paylines 52 is associated with each of the symbols 200, 202, and 204. In one embodiment, the probability associated with the free spin symbol 204 is less than at least one of the probabilities associated with any other symbols 200 and 202 on the reels 54. In another embodiment, the probability associated with the free spin symbol 204 is less than a plurality of the probabilities associated with any other symbols 200 and 202 on the reels 54. In a further embodiment, the probability associated with the free spin symbol 204 is less than all of the probabilities associated with any other symbols 200 and 202 on the reels 54. It should be appreciated that the probabilities associated with the award symbols 200, the free spin symbols 204 and the triggering symbols 202 may be set or changed to any suitable value as determined by the game implementer.

In another embodiment, the placement of, or the amount of, the side wager enhances the player's opportunity to obtain one or more free spins in the game. In one such instance, the gaming device increases the probability associated with the free spin symbol 204 so that the free spin symbol will occur or be indicated on the reels 54 more frequently.

Figure 4A:
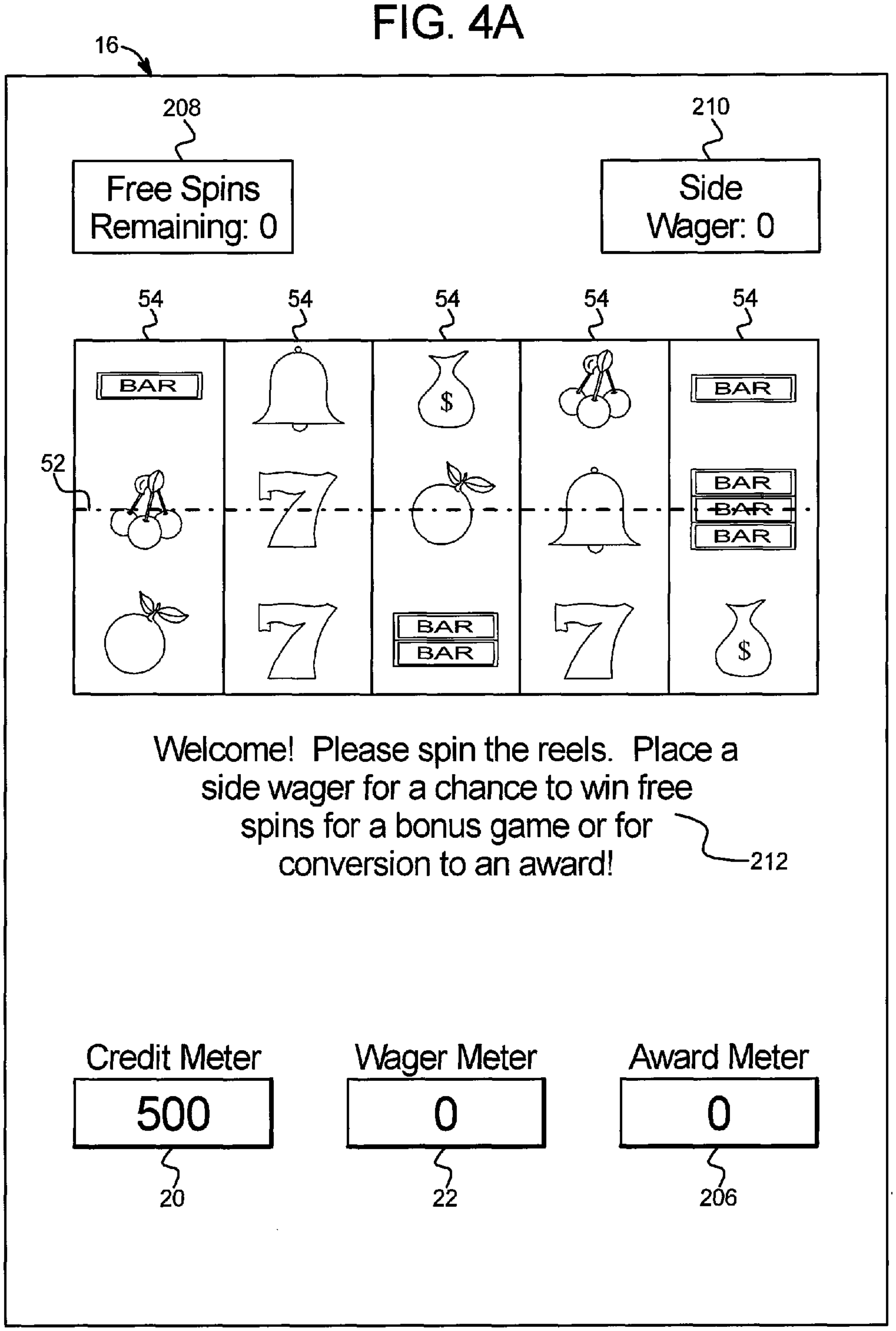
FIGS. 4A, 4B, 4C, 4D, 4F, 4G, 4H, 4I, 4J, 4K, and 4L are front views of a display device of one embodiment of the gaming device, wherein the display device displays one example of a free spin game having at least one free spin symbol.
Figure 4B:
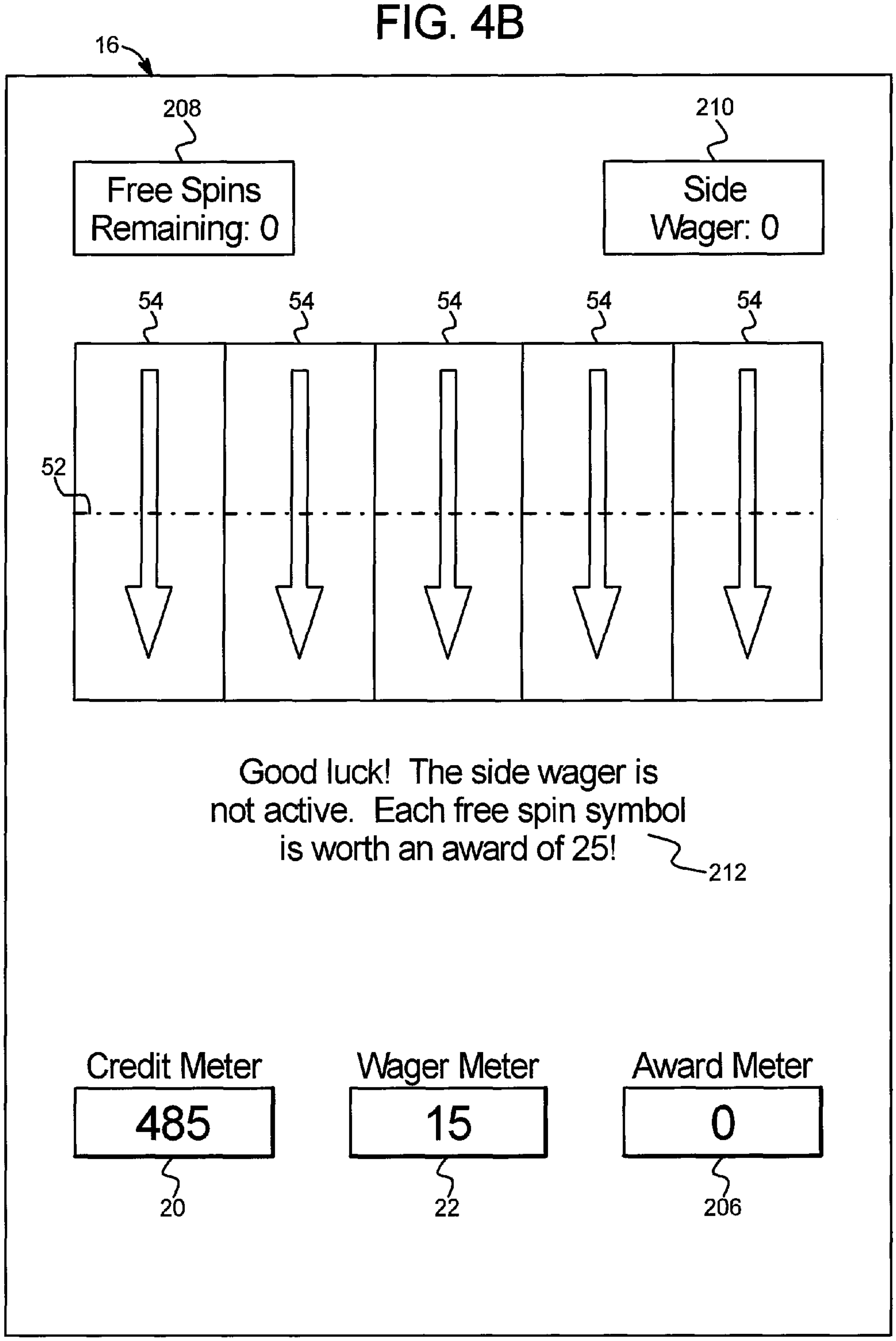
Figure 4C:
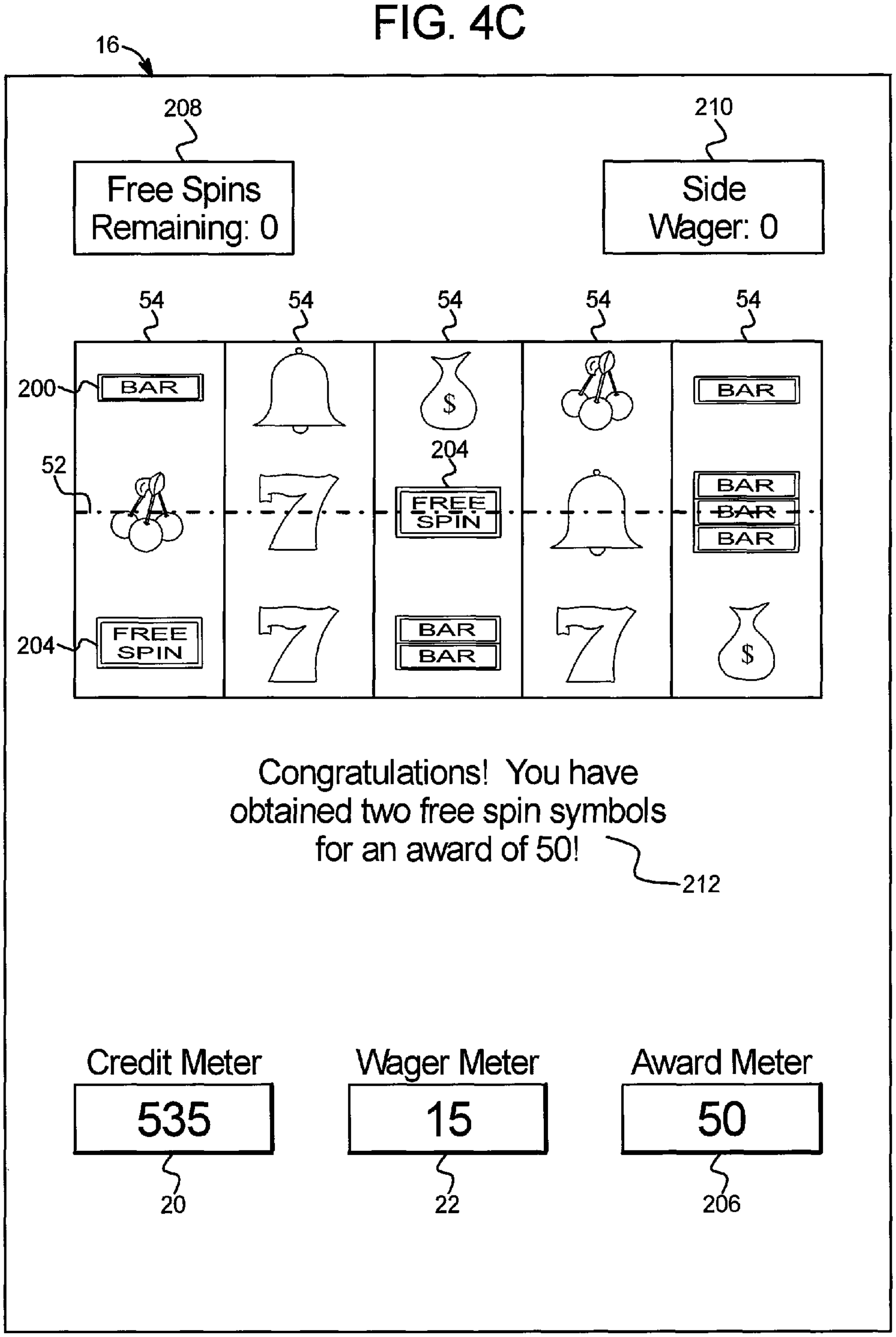

In one embodiment, the game begins by activating the reels 54. FIGS. 4A to 4C illustrate one spin of the reels 54 during one play of the game. In the embodiment illustrated in FIG. 4A the gaming device spins the reels to arrange the symbols at respective stop positions of the reels 54. To spin the reels, a player presses or activates the play button 32 of the gaming device 10 after placing a wager. Each reel spins independently of the other reels until each reel stops at a generated stop position to indicate a combination of symbols 200, 202, and 204 along the one or more paylines 52. Each reel 54 independently generates three of the symbols 200, 202, and/or 204, which are displayed at respective positions in a plurality of rows.

The display device 16 displays a credit display 20 which indicates the number of credits available to the player to wager or bet on the primary game. The display device 16 also displays a bet or wager display 22 which indicates the number of credits the player wagered or bet on the primary game. The display device 16 further displays an award display 206 that indicates a total value of any awards accumulated by the player in the primary game. In one embodiment, the display device 16 displays a paytable display (not shown) to indicate information associated with a paytable of the game. Such information may be accessed by the player upon a player request or input and may include one or more awards associated with winning symbols or symbol combinations in the primary game.

The display device 16 also displays a free spins accumulated remaining display 208. The free spins accumulated remaining display 208 indicates any free spins won by the player during plays of the primary game. The free spins accumulated remaining display 208 accounts for, or accumulates, the free spins won by the player during plays of the primary game.

With continued reference to FIG. 4A, the display device 16 displays a side wager meter 210. The side wager meter 210 indicates whether the player has placed a side wager. In one embodiment, the side wager meter 210 also indicates the amount of the side wager, such as a number of credits or tokens. In one alternative embodiment, the side wager meter 210 indicates a number of side wagers independent of an amount for each side wager. In one such instance, the side wager meter 210 displays the number of side wagers in addition to, or as a replacement for, the amount of the side wager. For example, the side wager meter 210 could display "5" to indicate that the player has placed one side wager for 5 credits or tokens. In another example, the side wager meter 210 could display "5" to indicate that the player has placed five separate side wagers (the amounts of which may or may not be displayed).

In one embodiment, the player can place the side wager via a plurality of input devices 30 in communication with the processor of the gaming device 10. In one such instance, the input device includes a touch screen 42 which causes the side wager meter 210 to act as a side wager button. If the player touches the side wager meter 210, the side wager meter activates and indicates the amount of the side wager. For example, every time the player presses the side wager meter 210, the side wager meter 210 increases by one credit or token. In another example, every time the player presses the side wager meter 210, the side wager meter increases by one side wager. In this example, each side wager is associated with a predetermined number of credits so that each time the player presses the side wager meter 210, the side wager meter 210 indicates or activates one side wager of the predetermined number of credits.

In the embodiment illustrated in FIGS. 4A to 4J, the side wager meter 210 indicates whether the player has placed a side wager by displaying the amount of the side wager, if any, placed by the player. If the side wager meter 210 indicates "0" then the player has not placed a side wager. If the side wager meter 210 indicates "5" then the player has placed a side wager of five credits or tokens. Such credits or tokens can be subtracted from the any credits or tokens indicated by the credit meter 20 or can be funded by the player through the payment device 24, the coin slot 26, or the note, ticket or bill acceptor 28.

The display device 16 includes a message area 212 that displays messages, information or instructions to the player. Such messages, information or instructions can be in any suitable form, such as audio, visual or audio-visual formats. In the embodiment illustrated in FIG. 4A, the message area 212 displays "WELCOME! PLEASE SPIN THE REELS. PLACE A SIDE WAGER FOR A CHANCE TO WIN ADDITIONAL FREE SPINS FOR A BONUS GAME OR FOR CONVERSION TO AN AWARD!" or any other suitable message to communicate instructions or information to the player during play of the game.

In the embodiment illustrated in FIGS. 4A to 4L, each free spin symbol that occurs on the reels is either associated with (i) a quantity of five free spins if the side wager is placed or (ii) an award of twenty-five credits if the side wager is not placed. It should be appreciated that the quantity of free spins, the amount of the award and whether the free spin symbol is associated with an award if the side wager is not placed are determined by the game implementer. In one embodiment, the free spin symbol is associated with a quantity of free spins if the side wager is placed, and functions as an award symbol which may or may not be associated with an award if the side wager is not placed.

Referring now to FIG. 4B, the player has placed a wager of 15 credits or tokens through an input device or a game activation device, such as a play button 32 or a pull arm (not shown). The input device or game activation device is used by the player to start any primary game or sequence of events in the gaming device after the gaming device is appropriately funded. The amount of the player's wager is indicated by the wager meter 22 and deducted from the player's remaining credits indicated by the credit meter 20. The credit meter 20 indicates that the player has 485 credits remaining after the wager. Upon placement of the wager, the processor of the gaming device 10 enables the player to spin or activate the reels 54. As the reels spin, the processor of the gaming device 10 may change the message displayed in the message area 212. In the embodiment illustrated in FIG. 4B, the message area 212 displays "GOOD LUCK! THE SIDE WAGER IS NOT ACTIVE. EACH FREE SPIN SYMBOL IS WORTH AN AWARD OF 25." This message informs the player that the side wager is not active (i.e., the player did not accept the opportunity to place the side wager). As a result, any free spin symbols 204 indicated by the reels will not result in additional free spins for the player. Instead, any free spin symbol 204 indicated by the reels will result in an award of 25 credits provided to the player.

Referring now to FIG. 4C, the display device 16 displays the reels 54 after the spin. The reels 54 have stopped spinning so that one symbol of each reel 54 is aligned along the payline 52. The processor of the gaming device 10 determines whether the side wager is inactive (i.e., whether the player rejected the opportunity to place the side wager). In one embodiment, each free spin symbol 204 that occurs on the reels after the reels stop spinning is associated with an award if the side wager is not active. It should be appreciated that the gaming device may award prizes after the reels stop spinning if specified types and/or configurations of indicia or symbols: (i) occur on an active payline, (ii) occur in a winning pattern, (iii) occur on the requisite number of adjacent reels and/or (iv) occur in a scatter pay arrangement.

The gaming device evaluates the symbols indicated on the reels during an award evaluation once the reels have stopped. In one embodiment, the gaming device evaluates the symbols indicated by one or more of the paylines 52. In other embodiments, the gaming device evaluates all of the symbols indicated by the reels 54. As illustrated in FIG. 4C, two free spin symbols 204 occur on the reels 54. One of the free spin symbols 204 is aligned along the payline 52 and the other free spin symbol is not aligned with the payline 52. The player did not place the side wager so the gaming device 10 provides the player with an award for each of the two free spin symbols 204 that occur on the reels 54. As mentioned above for this embodiment, each free spin symbol 204 is associated with twenty-five credits if the player did not place the side wager. It should be appreciated that in different embodiments, each free spin symbol can function as an award symbol, a wild symbol, or any other symbol in the primary game when the side wager is not placed or active.

The display device 16 displays the award meter 206 which changes to indicate the fifty credits won by the player. The player won twenty-five credits for each of the two free spin symbols 204 indicated on the reels. The processor of the gaming device 10 changes the credit meter from 485 credits to 535 credits to reflect the award (i.e., fifty credits) provided to the player. The processor of the gaming device 10 causes the message displayed in the message area 212 to display "CONGRATULATIONS! YOU HAVE OBTAINED TWO FREE SPIN SYMBOLS FOR AN AWARD OF 50!" This message informs the player that the gaming device 10 provided the player with twenty-five credits for each of the free spin symbols 204 indicated by the reels.

Figure 4D:
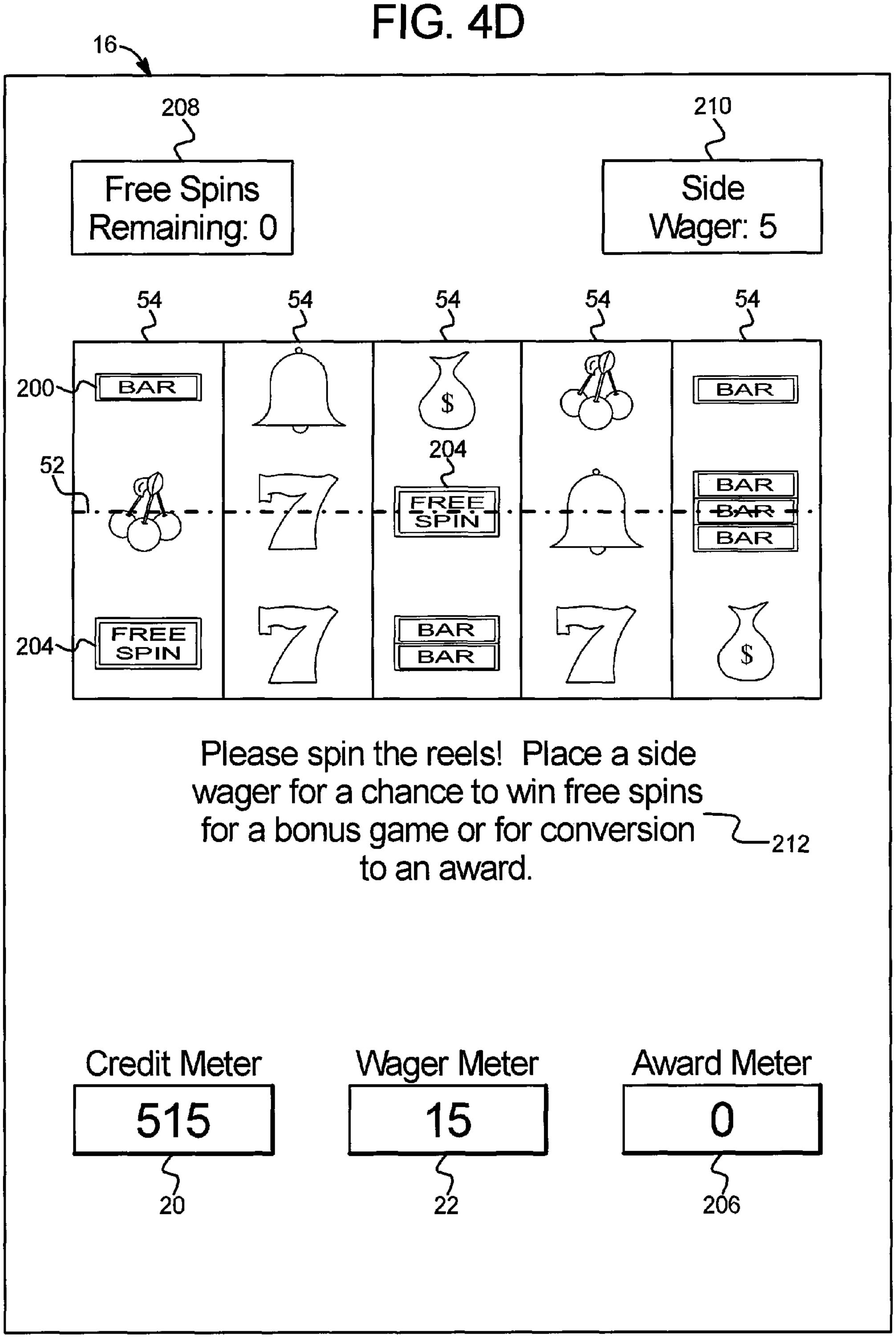
Figure 4E:
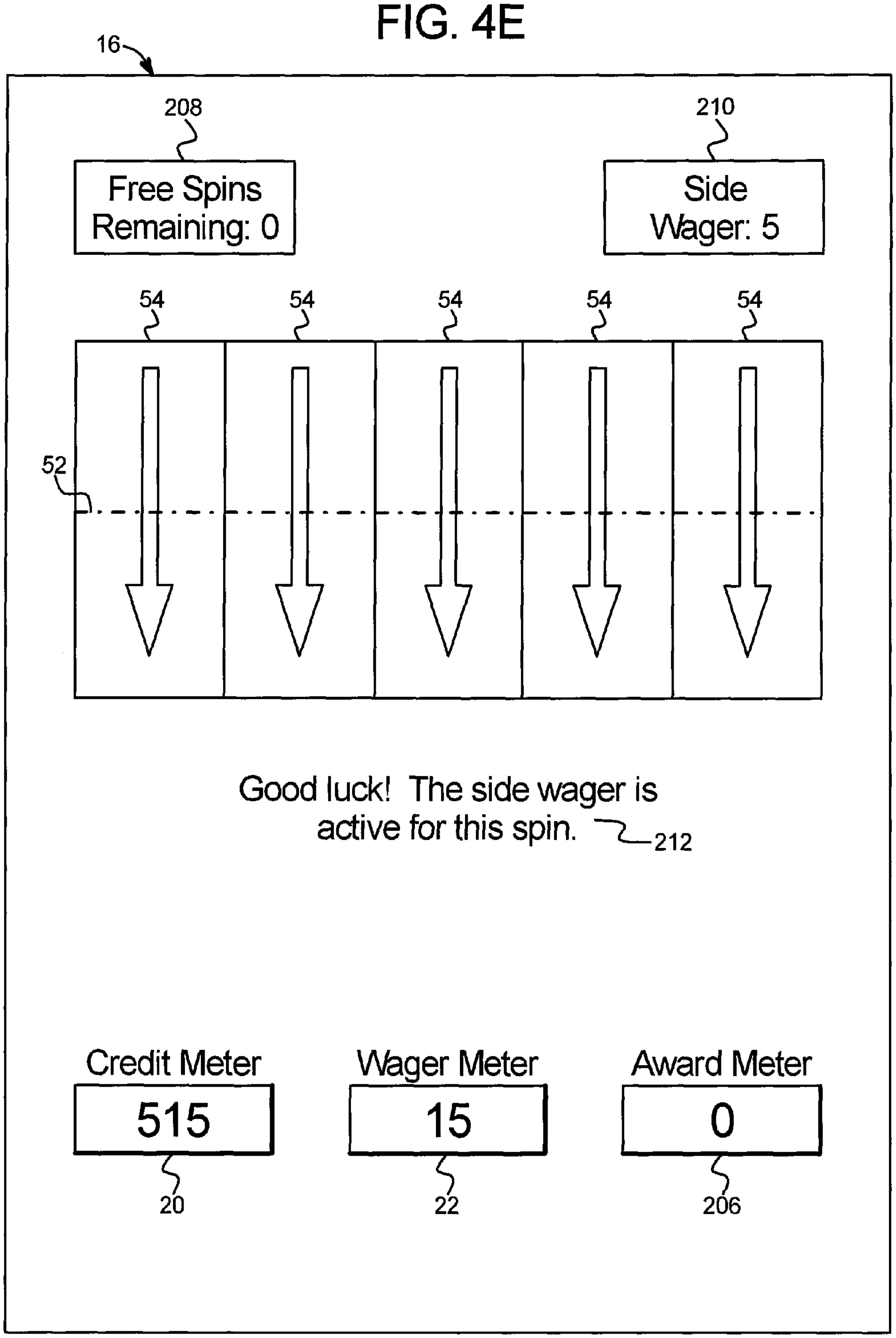
Figure 4F:
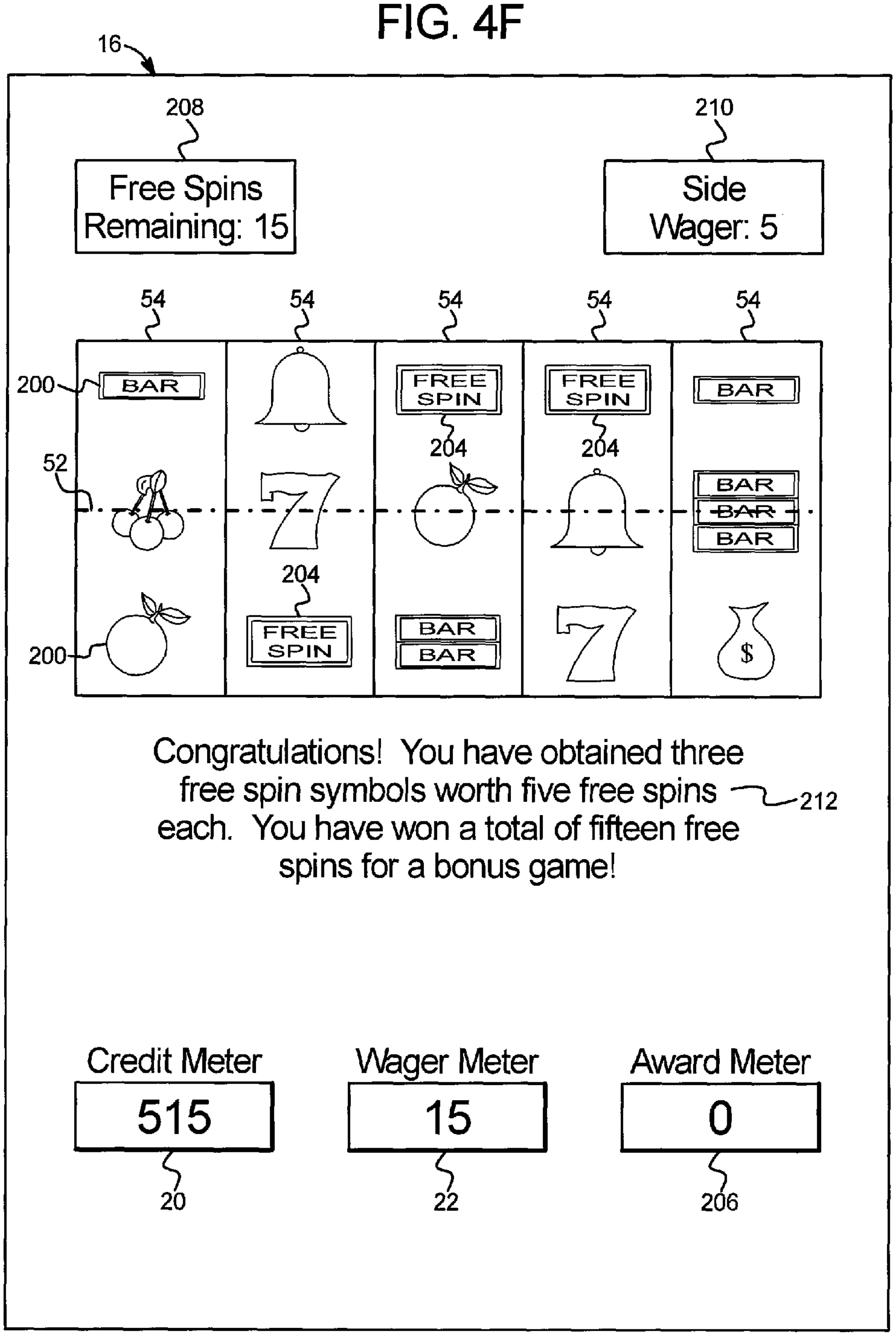

Referring now to FIGS. 4D to 4F, the display device 16 displays another play of the game. For this play of the game, the player has wagered fifteen credits as indicated by the wager meter 22. The credits remaining in the credit meter 20 decrease by the wager amount (i.e., fifteen credits). The player has also wagered five credits as a side wager as indicated by the side wager meter 210. The credits remaining in the credit meter 20 decrease by the side wager amount (i.e., five credits). The player has 515 credits remaining after placing the primary wager of fifteen credits and the side wager of five credits.

Referring to FIG. 4D, the message area 212 displays "PLEASE SPIN THE REELS! PLACE A SIDE WAGER FOR A CHANCE TO WIN FREE SPINS FOR A BONUS GAME OR FOR CONVERSION TO AN AWARD." or any other suitable message to communicate instructions or information to the player. After the player wagers and causes the reels to spin, as shown in FIG. 4E, the message area 212 displays "GOOD LUCK! THE SIDE WAGER IS ACTIVE FOR THIS SPIN." or any other suitable message to communicate instructions or information to the player. In one embodiment, the message area 212 illustrated in FIG. 4D and/or FIG. 4E displays a message indicating that the side wager is active for this spin of the reels 54 and the quantity of free spins associated with each free spin symbol 204.

Referring now to FIG. 4F, the reels 54 have stopped spinning. Three free spin symbols 204 are indicated on the reels 54. Since the side wager is active (i.e., the player placed the side wager) for this spin of the reels 54, the gaming device provides the player with five additional free spins for each free spin symbol 204 indicated on the reels 54. The free spins accumulated remaining display 208 indicates the fifteen additional free spins provided to the player. The message area 212 displays "CONGRATULATIONS! YOU HAVE OBTAINED THREE FREE SPIN SYMBOLS WORTH FIVE FREE SPINS EACH. YOU HAVE WON FIFTEEN FREE SPINS FOR A BONUS GAME!" or any other suitable message to communicate that the player has won an additional free spin for the bonus game.

Figure 4G:
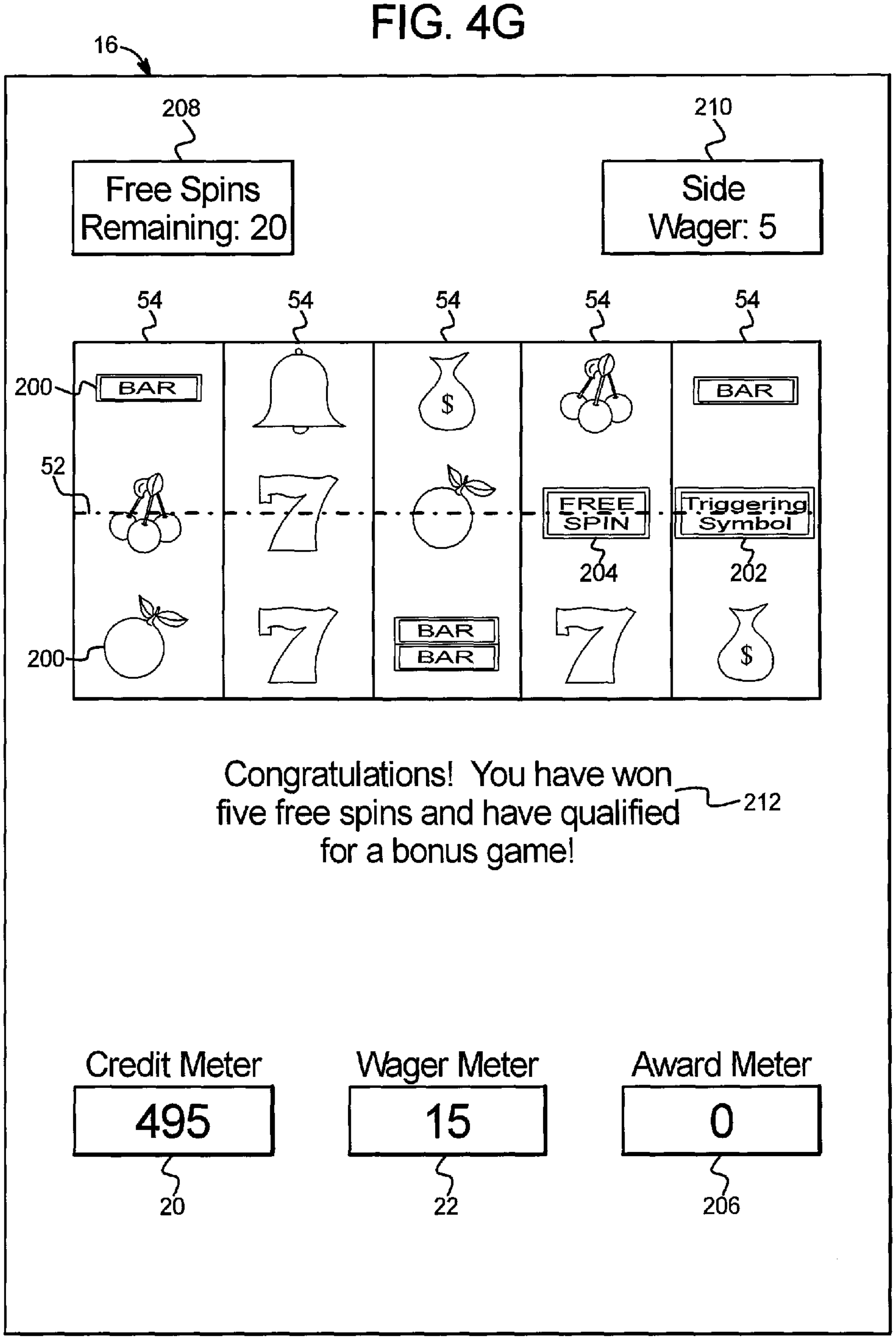
Figure 4H:
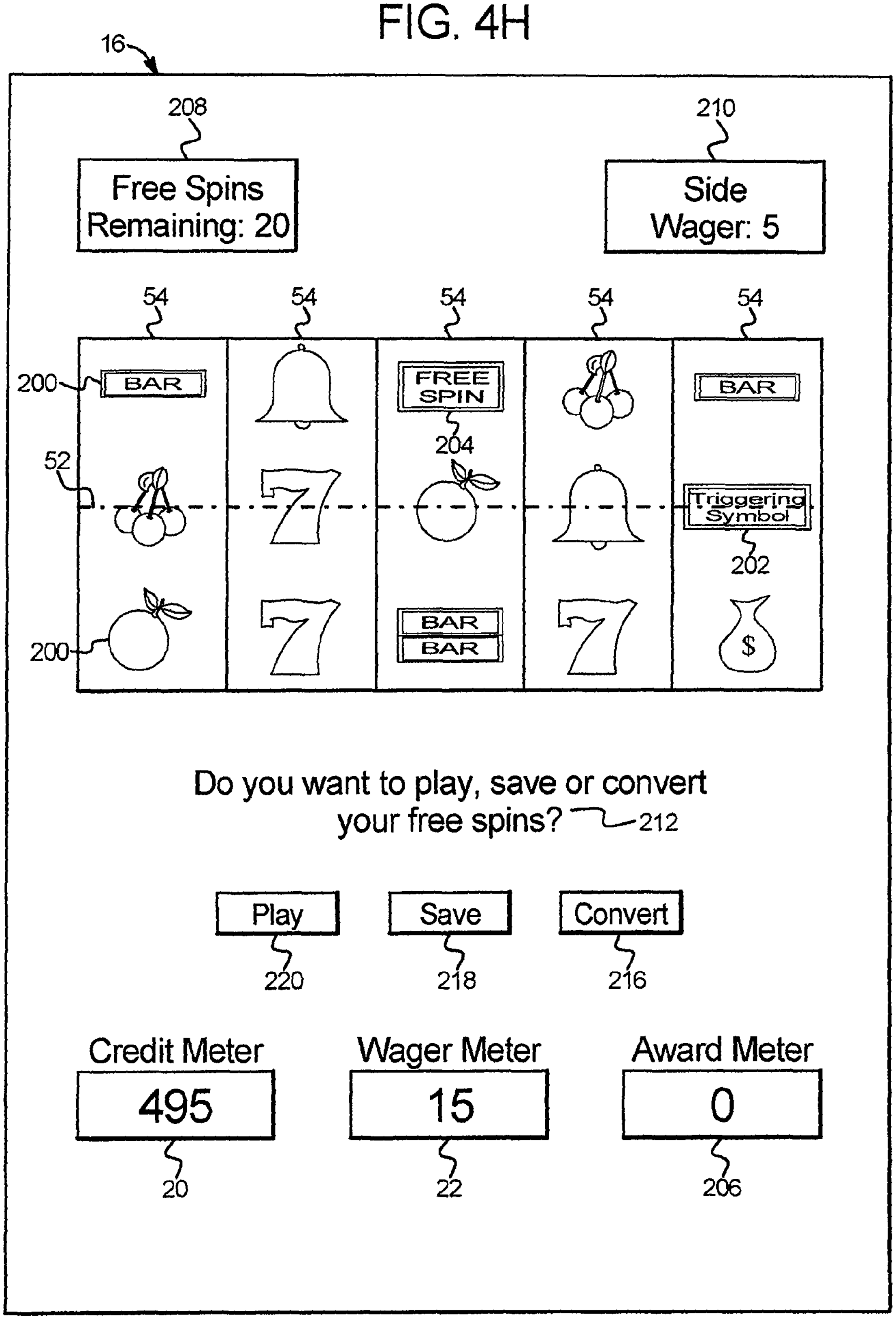

Referring now to FIGS. 4G and 4H, the display device 16 displays another play of the game. For this play of the game, the player has wagered fifteen credits as indicated by the wager meter 22. The credits remaining in the credit meter 20 decrease by the wager amount (i.e., fifteen credits). The player has also wagered five credits as a side wager as indicated by the side wager meter 210. The credits remaining in the credit meter 20 decrease by the side wager amount (i.e., five credits). The player has 495 credits remaining after placing the primary wager of fifteen credits and the side wager of five credits.

For this play of the game, the reels 54 are spun and stopped. As illustrated, the reels 54 have stopped so that the triggering symbol 202 occurs on the payline 52 and a free spin symbol 204 occurs on the reels 54. The free spins accumulated remaining display 208 increases by five additional or accumulated to twenty additional or accumulated free spins. In this embodiment, the occurrence of the triggering symbol 202 on the payline 52 qualifies the player for the bonus game. As mentioned above, the bonus game can also be triggered or initiated with a plurality of different triggering events that include, but are not limited to, the triggering symbol 202 being indicated on the payline 52, a random event, a predetermined event, or independent from the primary game.

Referring to FIG. 4G, the message area 212 displays "CONGRATULATIONS! YOU HAVE WON FIVE FREE SPINS AND QUALIFIED FOR A BONUS GAME!" or any other suitable message to communicate that the player has qualified for a bonus game. In one embodiment, after notifying the player that the bonus game was triggered, the gaming device enables the player to select how to use any free spins accumulated during one or more plays of the primary game. In the embodiment illustrated in FIG. 4H, the message area 212 displays "DO YOU WANT TO PLAY, SAVE, OR CONVERT YOUR FREE SPINS FOR THE BONUS GAME?" As illustrated, the message area 212 includes inputs 216, 218, and 220 representing options for the player to select. Input 216 corresponds to a convert free spins button which when selected by the player, enables the player to convert any of the additional or accumulated free spins to an award. If the player selects input 216, the gaming device provides the player with an award, such as a monetary value, for each free spin won or accumulated in the primary game.

Input 218 corresponds to a save free spins button which when selected by the player, enables the player to save or store some or all of the additional or accumulated free spins for a subsequent bonus game or for a later time. If the player selects Input 218, the gaming device reserves any saved or stored free spins for a subsequent bonus or secondary game or for a later time. This enables the player to selectively employ any additional or accumulated free spins from the primary game in the bonus or secondary game. The gaming device enables the player to decide when, if, and how many of the additional or accumulated free spins are used for the bonus game. For example, the display device 16 could display an option for the player to select how many free spins indicated by the free spins accumulated remaining display 208 to save or store. In one such instance, the message area 212 may display the option as "HOW MANY OF YOUR FREE SPINS WOULD YOU LIKE TO SAVE?" The player's input determines how many of the free spins indicated by the free spins accumulated remaining display 208 are saved or stored. Any free spins indicated by the free spins accumulated remaining display 208 that are not saved or stored remain available for the player to use or play in the bonus game. If the player chooses to save or store all of the additional or accumulated free spins, the saved accumulated or additional free spins remain displayed by the free spins accumulated remaining display 208 the gaming device enables the player to begin a new play of the primary game by placing a primary wager and/or a side wager as illustrated in FIG. 4A.

Input 220 corresponds to a play free spins button which when selected by the player, enables the player to play or use any of the additional or accumulated free spins in the bonus game. If the player selects input 220, the gaming device adds the additional or accumulated free spins to the initial quantity of free spins for the bonus or secondary game. This gives the player more free spins, or additional award opportunities, for the bonus or secondary game.

In one embodiment, the gaming device automatically provides any accumulated or additional free spins won during one or more plays of the primary game to the player for use or play in the triggered bonus game. In other words, the gaming device automatically selects input 220 for the player. Such selection may be based on a player's wager, a player status (as determined through a suitable player tracking system), a player's rate of play, or any other suitable factor. In one embodiment, as illustrated in FIGS. 4I, 4J, 4K, and 4L, the display device 16 of the gaming device displays one or more of the images or buttons 216, 218, and 220 for selection by the player for the bonus game. It should be appreciated that at least images or buttons 216 and 218 could also be displayed for the primary game.

Figure 4I:
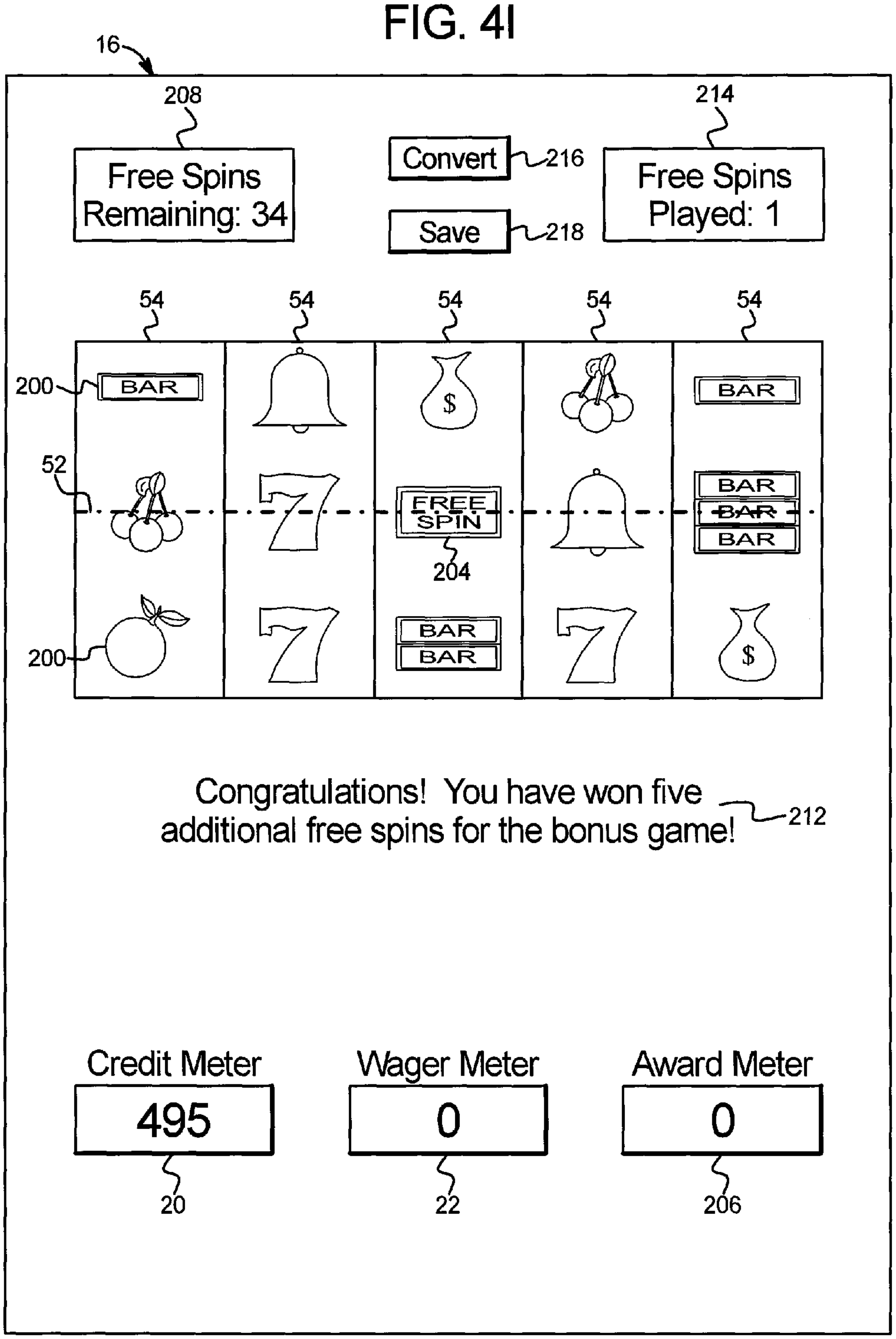

In the embodiment illustrated in FIG. 4I, the player has selected the input 220 to play the accumulated or additional free spins displayed by the free spins accumulated remaining display 208 in the bonus game. The display device 16 indicates a first free spin of the reels 54 for the bonus game. In this embodiment, the bonus game provides an initial quantity of ten free spins to the player. These ten initial free spins are added to the twenty additional or accumulated free spins won by the player in the primary game. In this embodiment, the player begins the bonus game with thirty free spins based on the additional or accumulated free spins won by the player in the primary game. The initial quantity of free spins is determined by the game implementer and can include zero, one or any other number of free spins.

For a first free spin of the bonus game, the player uses or plays one accumulated or additional free spin won during one or more plays of the primary game to cause the reels 54 to spin. One accumulated or additional free spin is deducted from the free spin remaining display 208 and added to a free spins played display 214. The free spins played display 214 indicates any free spins played or used by the player during one or more plays of the bonus or secondary game. When the player uses or plays a free spin, the number of free spins indicated by the free spins accumulated remaining display 208 decreases by one free spin and the number of free spins indicated by the free spins played display 214 increases by one free spin.

The reels 54 stopped to indicate one free spin symbol 204, which in this embodiment, provides the player with five additional free spins in the bonus game. These additional free spins are added to the free spin remaining display 208. The free spin remaining display 208 indicates that the player has thirty-four free spins remaining for the bonus game. The first free spin of the bonus game resulted in the player using one free spin (as indicated by the free spins played display 214) and gaining five free spins (as indicated by the free spins accumulated remaining display 208).

It should be appreciated that the free spin symbol 204 in the bonus game could be associated with the same quantity or a different quantity of free spins as the free spin symbol 204 in the primary game. For example, the free spin symbol 204 in the bonus game could be associated with one free spin while the free spin symbol 204 in the primary game could be associated with five free spins.

In one instance, the message area 212 displays a message to the player indicating that the player won additional free spins during the free spin of the bonus game. In the embodiment illustrated in FIG. 4I, the message area 212 displays "CONGRATULATIONS! YOU HAVE WON FIVE ADDITIONAL FREE SPINS FOR THE BONUS GAME!" or any other suitable message to communicate that the player won an additional free spin for the bonus game.

The primary wager indicated by the wager meter 22 indicates zero since the player uses or plays free spins of the reels 54 for the bonus game. The award meter 206 indicates zero because the free spin symbol 204 and award symbols 200 indicated on the reels 54 during this spin of the bonus game are not associated with an award. In one embodiment, the free spin symbol 204 indicated on the reels 54 during one or more plays of the bonus game is associated with an award or a monetary value, which is provided to the player along with the associated quantity of free spins.

It should be appreciated that the gaming device 10 may require for the player to use or play any additional or free spins won during one or more plays of the bonus game in that bonus game. For example, the player automatically uses or plays the additional or accumulated free spin won during the bonus game as the next free spin of the bonus game. Alternatively, the gaming device 10 enables the player to selectively use any additional or free spins won during the bonus game. For example, the player can save the accumulated or additional free spins for a subsequent bonus game or for conversion into an award.

Figure 4J:
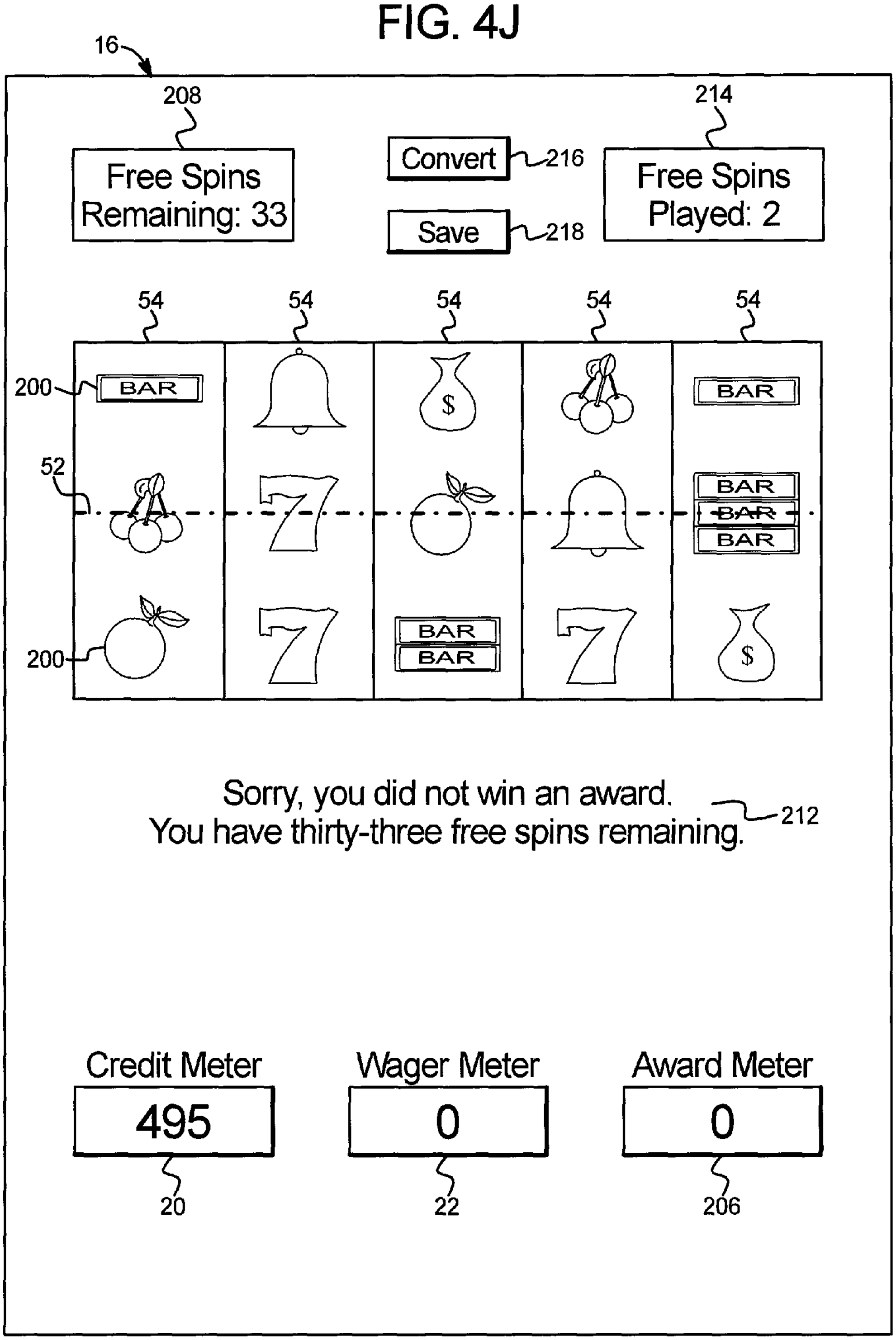

In the embodiment illustrated in FIG. 4J, the display device 16 indicates a second free spin of the reels 54 for the bonus game. The player used or played one of the free spins indicated by the free spins accumulated remaining display 208 for the second free spin. In one embodiment, the gaming device [forces or requires] that the player use or play the free spin(s) won during the first spin of the bonus game to cause the reels 54 to spin in the second free spin. The used or played free spin is deducted from the free spin remaining display 208 and added to the free spins played display 214. The reels 54 have stopped to indicate no winning symbols or symbol combinations for the second free spin. The free spin remaining display 208 indicates that the player has thirty-three free spins remaining for the bonus game. Although the player has used two free spins as indicated by the free spins played display 214, the player has thirty-three free spins remaining because the player won five free spins in the first free spin of the bonus game.

In one instance, the message area 212 displays a message to the player indicating any award won by the player during the free spin of the bonus game. In the embodiment illustrated in FIG. 4J, the message area 212 displays "SORRY, YOU DID NOT WIN AN AWARD FOR THIS SPIN. YOU HAVE THIRTY-THREE SPINS REMAINING." or any other suitable message to communicate the award, if any, won by the player with the free spin of the bonus game.

The primary wager indicated by the wager meter 22 remains at zero since the player used or played a free spin to spin the reels 54 for the bonus game. The award meter 206 indicates zero because the reels 54 did not indicate an award for this free spin of the bonus game. If the reels 54 had indicated an for this free spin of the bonus game, the award meter 206 would display the amount of such award.

In one embodiment, the bonus game ends when the player has no additional or accumulated free spins remaining. In another embodiment, the bonus game ends when the player wishes to save the remaining additional or accumulated free spins indicated by the free spins accumulated remaining display 208. For example, the player starts the bonus game with thirty free spins and has seven free spins remaining for the bonus game. The player can save the remaining free spins and cause the bonus game to end (e.g., by pressing the input 218). As described above, the saved free spins may be saved to the player's player tracking account or stored by the gaming device. If any free spins are saved or stored, the saved free spins are displayed by the free spins accumulated remaining display 208 for the next play of the primary game played by that player. The saved free spins can be used by the player for a subsequent bonus game or for conversion to an award at a later time.

The embodiment illustrated in FIGS. 4I and 4J shows a bonus or secondary game that includes an initial quantity of ten free spins. In another embodiment, the bonus game could begin with zero free spins. It should be appreciated that the initial quantity of free spins can include any number of free spins and be randomly determined, predetermined, determined by a wager made by a player or according to any suitable method. Regardless of the embodiment, any free spins won during one or more plays of the primary game are additional free spins which can be used to supplement an initial quantity of free spins for the bonus or secondary game, if any. Such additional free spins are accounted for, or tracked, via the free spins accumulated remaining display 208 as described above.

Figure 4K:
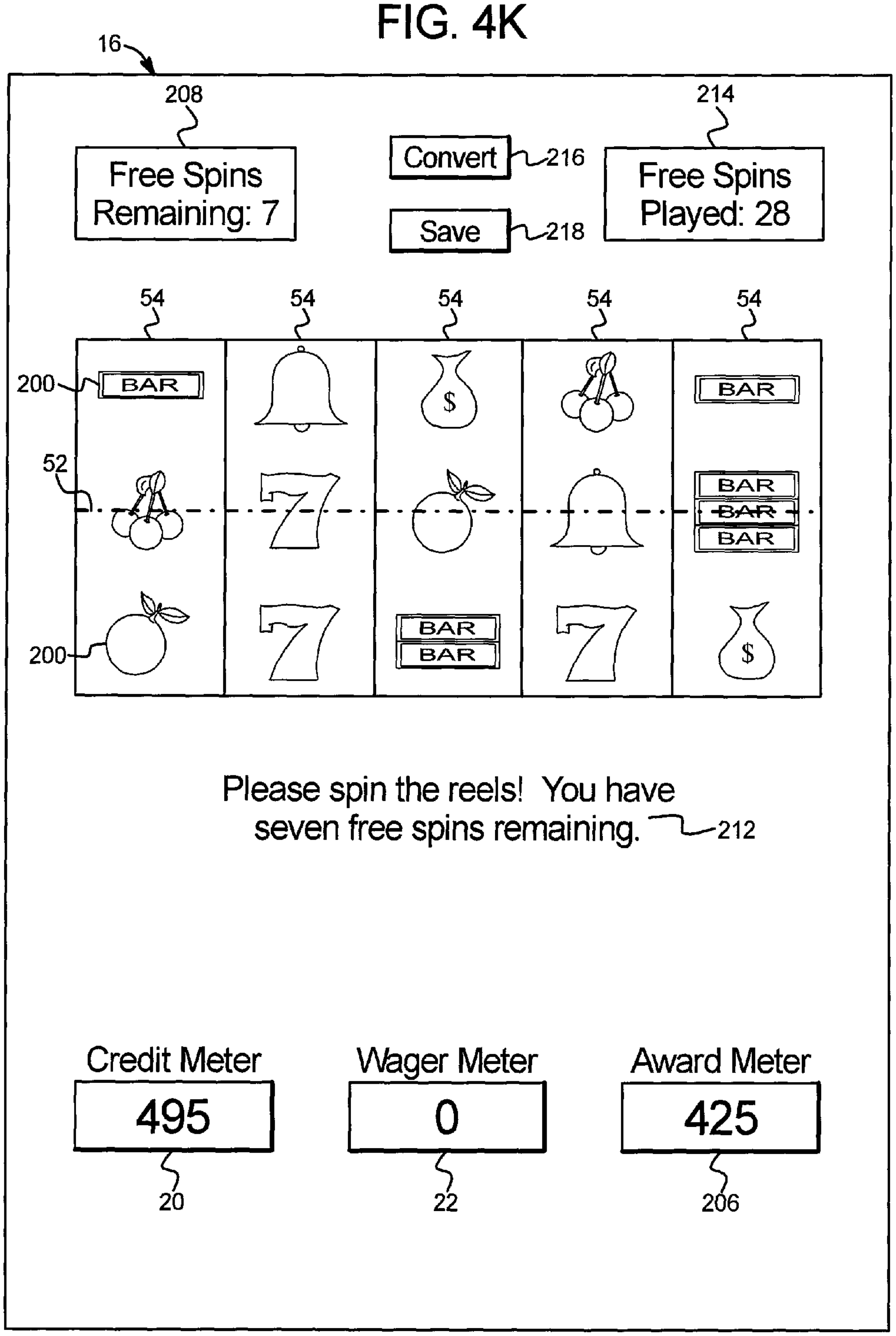
Figure 4L:
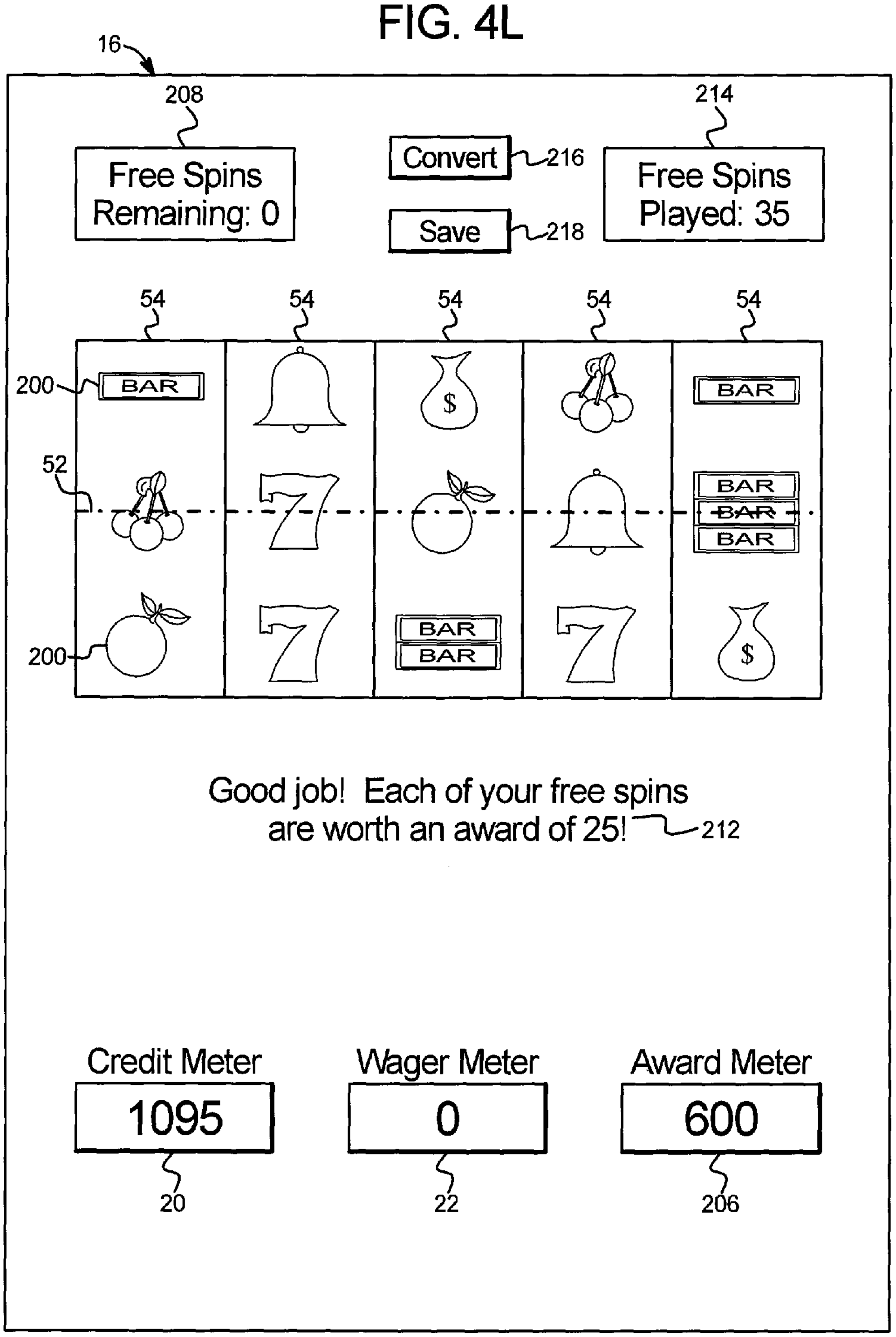

Referring now to FIGS. 4K and 4L, the display device 16 illustrates a conversion process where the player converts one or more free spins into an award. In the embodiment illustrated in FIG. 4K, the player has played twenty-eight free spins in the bonus game. The player has won an award of 425 credits as indicated by the award meter 206 at this point in the bonus game. The player has seven free spins remaining in the bonus game as indicated by the free spins accumulated remaining display 208. Each free spin indicated by the free spins accumulated remaining display 208 can be converted into an award, such as a monetary award of 25 credits, by the player. That is, if the player decides to convert the free spins into an award, the player will receive 25 credits for each free spin converted. This award (e.g., 25 credits) is referred to herein as the conversion rate for each free spin. The player converts the free spins by making an input through one of the input devices 30 associated with the gaming device 10.

In the embodiment illustrated in FIG. 4K, the display device 16 displays the convert free spins button 216. When the convert free spins button 216 is pressed, the gaming device 10 enables the player to convert the free spins indicated by the free spins accumulated remaining display 208 to an award. In one embodiment, the cash out button 34 or another input device of the gaming device 10 acts as the convert free spins button 216. That is, in one such embodiment, the gaming device 10 enables the player to convert the free spins indicated by the free spins accumulated remaining display 208 into an award after pressing the cash out button 34.

In one embodiment, the gaming device provides the player the option to convert some or all of the free spins indicated by the free spins accumulated remaining display 208 into an award. In one such embodiment, the gaming device enables the player to selectively convert some or all of the free spins indicated by the free spins accumulated remaining display 208. In one such embodiment, if the player chooses to convert the free spins into an award, the gaming device determines how many free spins can be converted into an award and provides the player with such options.

In one example, the display device 16 displays an option for the player to select how many free spins indicated by the free spins accumulated remaining display 208 to convert. In one such instance, the message area 212 may display the option as "HOW MANY OF YOUR FREE SPINS WOULD YOU LIKE TO CONVERT?" The player's input determines how many of the free spins indicated by the free spins accumulated remaining display 208 are converted into the award. Any free spins indicated by the free spins accumulated remaining display 208 that are not converted into the award remain available for the player to use or play in the bonus game. In one embodiment, the player can save any free spins not converted for a subsequent bonus game.

It should also be appreciated that these options to convert can be provided to the player if the player stops making the side wagers or upon any suitable condition or event.

The gaming device converts the free spins into an award based on the conversion rate associated with the free spins. In one embodiment, the conversion rate is the same for a plurality of the free spins or for each free spin. In another embodiment, the conversion rate is different for a plurality of the free spins or for each free spin. In different embodiments, the conversion rate is predetermined, randomly determined, determined based on a player's rate of play, determined based on a player status (as determined through a suitable player tracking system), or determined in any other suitable manner. As illustrated in FIGS. 4K and 4L, an award of 25 credits is provided to the player for each converted free spin.

Referring to FIG. 4K, the player has seven free spins as indicated by the free spins accumulated remaining display 208 and 495 credits as indicated by the credit meter 20. In the embodiment illustrated in FIG. 4L, the player converts all seven free spins into a monetary award of 175 credits. That is, each free spin indicated by the free spins accumulated remaining display 208 is converted into a monetary award of 25 credits and all of the free spins are converted when the convert free spins button 216 is pressed. This ends the bonus game because the player has no free spins remaining for play or use in the bonus game.

The monetary award of 175 credits is added to any previous award won by the player in the bonus game, as displayed by the award meter 206. Upon completion of the bonus game, the total award won by the player for that bonus game is added to the credit display 20. After converting the free spins, the player has 1095 credits as indicated by the credit display 20.

As indicated by the free spins played display 214, the player used or played thirty-five free spins in the bonus or secondary game. The player was provided an initial quantity of ten free spins for the bonus game. This quantity was increased based on the twenty free spins that the player accumulated during plays of the primary game. On the first free spin of the bonus game, the player won an additional five free spins. The gaming device including the free spin symbol described herein enabled the player to play an additional twenty-five free spins during the bonus game. These additional free spins helped the player to obtain additional or higher awards in the bonus game.

It should be appreciated that the conversion process illustrated in FIGS. 4K and 4L can occur before any play of the primary game or the bonus game, or between plays of the primary game or the bonus game. In one embodiment, the conversion process is not offered to the player for plays of the bonus game and can only occur before or between plays of the primary game. In one embodiment, the conversion rate (i.e., the award amount associated with each free spin) differs between the primary game and the bonus game. For example, free spins converted during one or more plays of the primary game are associated with 25 credits while free spins converted during one or more plays of the bonus game are associated with 10 credits. Alternatively, the conversion rate for each free spin is the same for the primary game and the bonus game.

In one embodiment, the conversion process does not affect play of the primary game. If a player converts free spins into awards before or between one or more plays of the primary game, the player reduces the number of free spins available to that player during the bonus game, if any.

In the embodiments of the gaming device described above, the gaming device enhances a player's opportunity to obtain one or more awards in a bonus or secondary game by utilizing additional free spins won during a primary game to provide a better opportunity of obtaining an award in the bonus game. In such instances, the processor of the gaming device enables the player to win additional free spins after placing a side wager. That is, if the player places the side wager, the gaming device provides the player with an opportunity to win one or more free spins in a play of the primary game.

In one embodiment, separate and different free spin symbols are associated with different quantities of free spins and/or different award amounts. In one example, a first free spin symbol is associated with 15 credits if the side wager is not placed and a one free spin if the side wager is placed. A second free spin symbol is associated with 50 credits if the side wager is not placed and three free spins if the side wager is placed. For this example, upon the occurrence of the first free spin symbol, the gaming device provides the player with a first designated number of free spins (e.g., one) and upon the occurrence of a second free spin symbol, the gaming device may provide the player with a second designated number of free spins (e.g., two).

Alternatively, separate and different free spin symbols are associated with different quantities of free spins and the same award amount. For example, the first and second free spin symbols are each associated with 25 credits if the side wager is not placed. In this instance, the first free spin symbol may be associated with one free spin if the side wager is placed and the second free spin symbol may be associated with three free spins if the side wager is placed. It should be appreciated that the quantity of free spins and the amount of any award associated with each free spin symbol can be set to any value as determined by the game implementer.

In another embodiment, each free spin symbol is associated with the same quantity of free spins and/or the same award amount. In one such instance, upon the occurrence of the first free spin symbol, the gaming device may either provide the player with a first designated number of free spins (e.g., one) and upon the occurrence of a second free spin symbol, the gaming device may provide the player with a second designated number of free spins (e.g., two). In this example, it should be appreciated that each free spin symbol may be associated with the same or different numbers of free spins.

In one embodiment, each free spin symbol can act as a wild symbol. In one such instance, when the free spin symbol occurs on the reels, the gaming device either (i) causes the free spin symbol to act as a wild symbol or (ii) accumulates a quantity of free spins depending on whether that player placed the side wager. The side wager may or may not be required to cause the free spin symbol to act as a wild symbol during an award evaluation. Causing the free spin symbol to act as a wild symbol increases the player's chances of obtaining a winning combination of symbols. In another embodiment, each free spin symbol acts as a wild symbol for plays of the game where the player has placed the side wager. In this embodiment, the placement of the side wager qualifies the player to win additional free spins while also providing the player additional opportunities to obtain a winning combination of symbols.

Although the side wager for winning free spins and the free spin symbol are described above with respect to a primary game, it should be appreciated that the side wager for winning free spins and the free spin symbol may be employed in a primary game, a bonus game, or as any other suitable type of game in a gaming device. Additionally, although the side wager for winning free spins and the free spin symbol are described with respect to a reel type game, it should be appreciated that any suitable non-reel type games, such as a video poker game, may be employed.

It should be appreciated that the free spin symbol may be employed in a primary game, a bonus game, a free game, a sub-game or in any other suitable game. That is, different wagering games, such as video poker games, video blackjack games, video keno, video bingo or any other suitable physical or computerized game, may be implemented with an opportunity to win free plays of the game. In games with playing cards, the free spin symbol can take the form of a free card. In one embodiment, if the player places a side wager, an occurrence of the free card in the player's hand causes the gaming device to deal the player an additional card from a deck of playing cards associated with that particular game. If the player does not place the side wager, the gaming device provides the player with an award associated with the free card. Alternatively, if the player does not place the side wager, the gaming device ignores the can either be In another embodiment. Alternatively, the free spin symbol takes the form of a free card which causes the gaming device to is dealt from a deck of playing cards associated with that particular game.

The free spin symbol may be employed by a game that is displayed by either or both of the display devices 16 and 18 described above. In various embodiments, it should be appreciated that the free spin symbols disclosed herein could also be implemented in a cascading or falling symbol game as described above. Additionally, independent of how each symbol is generated or displayed, modification of the number of generated free spin symbols obtained in the primary game (e.g., either by modifying the number of reels or modifying the number of symbols generated on the reels), modifies the number of ways to win free spins in the primary game.

In one embodiment, the gaming device 10 includes any one of the embodiments described above. In another embodiment, the gaming device 10 includes any suitable combination of such embodiments. In a further embodiment, the gaming device 10 includes any suitable combination of one or more portions of such embodiments.

In one embodiment, the gaming device enables the player to save or store any free spins won in the primary game. In this embodiment, the player selectively chooses whether to utilize the free spins won in the primary game. For example, if the player has won or accumulated three free spins during play of the primary game, and a bonus game is triggered, the player may save two of the free spins and use the one remaining free spin in the bonus game.

In one embodiment, the gaming device includes a free spins accumulated remaining display. The free spins accumulated remaining display indicates the number of free spins accumulated remaining for the player in a game. The free spins remaining display includes or indicates any free spins won by the player in plays of the primary game. Such free spins are accumulated over one or more plays or rounds of the primary game. Such spins can include any number or quantity of free spins.

In one embodiment, the gaming device provides a bonus or secondary game including an initial quantity of free spins of the reels to the player. The initial quantity of free spins may include one or more free spins. The initial quantity of free spins may be randomly determined, predetermined, determined by a wager made by a player or according to any suitable method. Any free spins won during the primary game are referred to as additional free spins which can be used in addition to the initial quantity of free spins in the bonus or secondary game. Such additional free spins can be accounted for, or tracked, via the free spins accumulated remaining display. In one embodiment, the gaming device enables the player to use or save the additional free spins for each bonus or secondary game. If the player chooses to use the additional free spins, the additional free spins are added to the initial quantity of free spins to give the player more free spins for the bonus or secondary game. If the player chooses to save the additional free spins, the additional free spins are stored for a subsequent bonus or secondary game.

For each free spin, the gaming device spins the reels and determines the award, if any, associated with any indicated symbols on the reels. When one or more free spin symbols are indicated on the reels, the gaming device provides the player with one or more free spins. For example, if two free spin symbols are indicated on the reels in a free spin, the gaming device provides the player with two additional free spins for the bonus or secondary game. The gaming device provides the player with the determined award or free spins based on the symbols indicated in each free spin. The gaming device or the player continues to spin the reels until there are no free spins remaining. The gaming device then provides the player with the total award indicated by a total award display at the end of the bonus or secondary game.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one display device;

at least one input device;

at least one processor; and at least one memory device storing a plurality of instructions which, when executed by the at least one processor, cause the at least one processor to operate with the at least one display device and the at least one input device to:

(a) for each play of a primary game, the primary game including a plurality of free activation symbols:

(i) receive a primary game wager from a player;

(ii) enable the player to place a side wager in addition to the primary game wager;

(iii) display said play of the primary game;

(iv) provide the player any awards based on said play of the primary game; and (v) if the player places the side wager, and if a designated quantity of the free activation symbols is indicated in said play of the primary game, the designated quantity being at least one, for each indicated free activation symbol:

(A) provide the player with a quantity of free activations, wherein the quantity of free activations is not usable until after a triggering event occurs, and wherein the quantity of free activations is at least one; and (B) add the quantity of free activations to an accumulated quantity of free activations;

(b) display the accumulated quantity of free activations; and (c) for each play of the primary game, upon the occurrence of the triggering event:

(i) regardless of whether the player has accumulated any free activations, initiate a play of the secondary game, the secondary game including an initial quantity of free activations usable in the secondary game in addition to any accumulated quantity of free activations, the initial quantity of free activations being at least one, and (ii) if the accumulated quantity of free activations is at least one, enable the player to make an input to indicate whether to use any of the accumulated quantity of free activations in the play of the secondary game.

2. The gaming system of claim 1, wherein the primary game includes a plurality of reels and a plurality of symbols on the reels, said symbols including the plurality of free activation symbols.

3. The gaming system of claim 1, wherein the quantity of free activations is randomly determined.

4. The gaming system of claim 1, wherein the quantity of free activations is based on a player characteristic of the player.

5. The gaming system of claim 4, wherein the player characteristic includes at least one of: an amount of any primary wager or any side wager placed by the player, a status or ranking of the player, and a rate of play of the player.

6. The gaming system of claim 1, wherein the plurality of instructions, when executed by the at least one processor, if the triggering event occurs, cause the at least one processor to operate with the at least one input device to enable the player to make an input to select whether to use all, part, or none of any accumulated quantity of free activations in the play of the secondary game.

7. The gaming system of claim 1, wherein the plurality of instructions, when executed by the at least one processor, cause the at least one processor to operate with the at least one input device to, if the triggering event occurs, enable the player to make an input to indicate whether to convert any of any accumulated quantity of free activations to a conversion award.

8. The gaming system of claim 1, wherein the plurality of instructions, when executed by the at least one processor, cause the at least one processor to operate with the at least one input device to, if the triggering event occurs, enable the player to make an input to indicate whether to save any of any accumulated quantity of free activations for use in a subsequent secondary game.

9. A gaming system comprising:

at least one display device;

at least one input device;

at least one processor; and at least one memory device storing a plurality of instructions which, when executed by the at least one processor, cause the at least one processor to operate with the at least one display device and the at least one input device to:

(a) for each play of the primary game, the primary game including a plurality of symbols, the symbols including a plurality of free activation symbols, each play of the primary game resulting in an indication of a plurality of the symbols:

(i) receive a primary game wager from a player;

(ii) enable the player to place a side wager in addition to the primary game wager;

(iii) evaluate any symbols indicated as a result of said play of the primary game;

(iv) display any awards associated with said indicated symbols;

(v) if the player places the side wager, and if said indicated symbols include a designated quantity of the free activation symbols, the designated quantity being at least one, for each indicated free activation symbol:

(A) provide the player with a first award;

(B) provide the player with a quantity of free activations, wherein the quantity of free activations is not usable until after a triggering event occurs, and wherein the quantity of free activations is at least one; and (C) add the quantity of free activations to an accumulated quantity of free activations; and (vi) if the player does not place the side wager, and if said indicated symbols include the designated quantity of the free activation symbols, provide the player with a second award for each indicated free activation symbol;

(b) display the accumulated quantity of free activations; and (c) for each play of the primary game, upon the occurrence of a triggering event:

(i) regardless of whether the player has accumulated any free activations, initiate a play of the secondary game, the secondary game including an initial quantity of free activations usable in the secondary game in addition to any accumulated quantity of free activations, the initial quantity of free activations being at least one, and (ii) if the accumulated quantity of free activations is at least one, enable the player to make an input to indicate whether to use any of the accumulated quantity of free activations in the play of the secondary game.

10. The gaming system of claim 9, wherein the primary game includes a plurality of reels and the plurality of symbols are on the reels.

11. The gaming system of claim 9, wherein the first award is different than the second award.

12. The gaming system of claim 9, wherein the quantity of free activations is either randomly determined or based on a player characteristic of the player.

13. The gaming system of claim 12, wherein the player characteristic includes at least one of: an amount of any primary wager or any side wager placed by the player, a status or ranking of the player, and a rate of play of the player.

14. The gaming system of claim 9, wherein the plurality of instructions, when executed by the at least one processor, if the triggering event occurs, cause the at least one processor to operate with the at least one input device to enable the player to make an input to select whether to use all, part, or none of any accumulated quantity of free activations in the play of the secondary game.

15. The gaming system of claim 9, wherein the plurality of instructions, when executed by the at least one processor, cause the at least one processor to operate with the at least one input device to, if the triggering event occurs, enable the player to make an input to indicate whether to convert any of any accumulated quantity of free activations to a conversion award.

16. The gaming system of claim 9, wherein the plurality of instructions, when executed by the at least one processor, cause the at least one processor to operate with the at least one input device to, if the triggering event occurs, enable the player to make an input to indicate whether to save any of any accumulated quantity of free activations for use in a subsequent secondary game.

17. A gaming system comprising:
at least one display device;
at least one input device;
at least one processor; and
at least one memory device storing a plurality of instructions which, when executed by the at least one processor, cause the at least one processor to operate with the at least one display device and the at least one input device to:
(a) for each play of a primary game, the primary game including a plurality of free activation symbols:
(i) after placement of a primary game wager by a player, display said play of the primary game;
(ii) provide the player any awards based on said play of the primary game; and
(iii) if a side wager was placed by the player for said play of the primary game, said side wager being in addition to said primary game wager, and if a designated quantity of the free activation symbols is indicated in said play of the primary game, the designated quantity being at least one, for each indicated free activation symbol:
(A) provide the player with a quantity of free activations, wherein the quantity of free activations is not usable until after a triggering event occurs, and wherein the quantity of free activations is at least one; and
(B) add the quantity of free activations to an accumulated quantity of free activations;
(b) display the accumulated quantity of the free activations; and
(c) for each play of the primary game, upon the occurrence of a triggering event:
(i) regardless of whether the player has accumulated any free activations, initiate a play of the secondary game, the secondary game including an initial quantity of free activations usable in the secondary game in addition to any accumulated quantity of free activations, the initial quantity of free activations being at least one; and
(ii) if the accumulated quantity of free activations is at least one:
(A) enable the player to make an input to indicate whether to use any of any accumulated quantity of free activations in the play of the secondary game; and
(B) enable the player to make an input to request conversion of any of the accumulated quantity of free activations not used for the secondary game to a conversion award.

18. The gaming system of claim 17, wherein the primary game includes a plurality of reels and a plurality of symbols on the reels, said symbols including the free activation symbols.

19. The gaming system of claim 17, wherein the quantity of free activations is randomly determined.

20. The gaming system of claim 17, wherein plurality of instructions, when executed by the at least one processor, if the triggering event occurs, cause the at least one processor to operate with the at least one input device to enable the player to make an input to select whether to use all, part, or none of any accumulated quantity of free activations in the play of the secondary game.

21. The gaming system of claim 17, wherein the plurality of instructions, when executed by the at least one processor, cause the at least one processor to operate with the at least one input device to, if the triggering event occurs, enable the player to make an input to request that an amount of any accumulated quantity of free activations be saved for use in a subsequent secondary game.

22. A gaming system comprising:
at least one display device;
at least one input device;
at least one processor; and
at least one memory device storing a plurality of instructions which, when executed by the at least one processor, cause the at least one processor to operate with the at least one display device and the at least one input device to:
(a) for each of play of a primary game including a plurality of symbols, the symbols including a plurality of free activation symbols:
(i) determine whether a player has made a primary game wager and a side wager for said play of the primary game;
(ii) if the player has made the primary game wager and the side wager for said play of the primary game:
(A) display a plurality of the symbols;
(B) evaluate the displayed symbols;
(C) display any awards based on the displayed symbols; and
(D) if a designated quantity of the displayed symbols are one of the free activation symbols, the designated quantity being at least one, increase an accumulated quantity of free activations by a quantity of free activations, wherein the accumulated quantity of free activations is not usable until after a triggering event occurs; and (iii) if the player has made the primary game wager and has not made the side wager for said play of the primary game:

(A) display a plurality of the symbols, (B) evaluate the displayed symbols, and (C) display any awards based on the displayed symbols;

(b) display the accumulated quantity of free activations; and (c) for each play of the primary game, regardless of whether the player places the side wager or has accumulated any free activations, determine whether a secondary event should be displayed, and if the secondary event should be displayed:

(i) initiate the secondary event, the secondary event including an initial quantity of free activations usable in the secondary event in addition to any accumulated quantity of free activations, the initial quantity of free activations being at least one;

(ii) if the accumulated quantity of free activations is at least one, enable the player to make an input to select whether to use any of the accumulated quantity of free activations in the secondary event;

(iii) display a total quantity of free activations, the total quantity of free activations including the initial quantity of free activations and the selected accumulated quantity of free activations; and (iv) provide any additional awards to the player based on the free activations of the total quantity of free activations.

23. The gaming system of claim 22, wherein the primary game includes a plurality of reels and the symbols are on the reels.

24. The gaming system of claim 22, wherein the increase based on any displayed free activation symbols is randomly determined.

25. The gaming system of claim 22, wherein plurality of instructions, when executed by the at least one processor, if the secondary event should be displayed, cause the at least one processor to operate with the at least one input device to enable the player to make an input to select whether to use all, part, or none of any accumulated quantity of free activations.

26. The gaming system of claim 22, wherein the plurality of instructions, when executed by the at least one processor, cause the at least one processor to operate with the at least one input device to, if the secondary event should be displayed, enable the player to make an input to select whether to convert any of any accumulated quantity of free activations to a conversion award.

27. The gaming system of claim 22, wherein the plurality of instructions, when executed by the at least one processor, cause the at least one processor to operate with the at least one input device to, if the secondary event should be displayed, enable the player to make an input to select whether to save any of any accumulated quantity of free activations for use in a subsequent secondary game.

* * * * *

UNITED STATES PATENT AND TRADEMARK OFFICE

CERTIFICATE OF CORRECTION

PATENT NO. : 8,231,456 B2
APPLICATION NO. : 11/873948
DATED : July 31, 2012
INVENTOR(S) : John H. Zielinski It is certified that error appears in the above-identified patent and that said Letters Patent is hereby corrected as shown below:

IN THE CLAIMS

In Claim 1, Column 35, Line 33, replace the second instance of “the” with --an--.
In Claim 5, Column 35, Line 56, after “primary” insert --game--.
In Claim 6, Column 35, Line 64, replace “any” with --the--.
In Claim 9, Column 36, Line 23, replace the first instance of “the” with --a--.
In Claim 9, Column 36, Line 55, replace the second instance of “the” with --an--.
In Claim 13, Column 37, at about Line 11, between “primary” and “wager” insert --game--.
In Claim 14, Column 37, Line 19, replace “any” with --the--.
In Claim 17, Column 37, Line 66, replace the second instance of “the” with --an--.
In Claim 17, Column 38, Line 11, replace the second instance of “any” with --the--.
In Claim 20, Column 38, Line 25, between “wherein” and “plurality” insert --the--.
In Claim 20, Column 38, at about Line 30, replace “any” with --the--.
In Claim 22, Column 38, Line 49, delete “of”.
In Claim 25, Column 40, Line 7, between “wherein” and “plurality” insert --the--.
In Claim 25, Column 40, Line 12, replace “any” with --the--.

Signed and Sealed this
Twenty-third Day of April, 2013

Teresa Stanek Rea
*Acting Director of the United States Patent and Trademark Office*